US011568595B2

(12) United States Patent
Logothetis et al.

(10) Patent No.: US 11,568,595 B2
(45) Date of Patent: Jan. 31, 2023

(54) COMPUTER VISION METHOD AND SYSTEM

(71) Applicant: Kabushiki Kaisha Toshiba, Tokyo (JP)

(72) Inventors: Fotios Logothetis, Cambridge (GB); Roberto Mecca, Cambridge (GB); Ignas Budvytis, Cambridge (GB); Roberto Cipolla, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/179,747

(22) Filed: Feb. 19, 2021

(65) Prior Publication Data

US 2022/0051471 A1 Feb. 17, 2022

(30) Foreign Application Priority Data

Aug. 11, 2020 (GB) .................................. 2012490

(51) Int. Cl.
*G06T 15/20* (2011.01)
*G06T 15/50* (2011.01)
(Continued)

(52) U.S. Cl.
CPC .......... *G06T 15/205* (2013.01); *G06K 9/6256* (2013.01); *G06N 3/08* (2013.01);
(Continued)

(58) Field of Classification Search
CPC ..................................................... G06T 7/586
See application file for complete search history.

(56) References Cited

U.S. PATENT DOCUMENTS

2021/0358211 A1* 11/2021 Kim ........................ G06T 7/593

FOREIGN PATENT DOCUMENTS

GB 2545394 A 6/2017
JP 2016-186421 A 10/2016

OTHER PUBLICATIONS

Zheng, Qian, et al. "SPLINE-Net: Sparse photometric stereo through lighting interpolation and normal estimation networks." Proceedings of the IEEE/CVF International Conference on Computer Vision. 2019. (Year: 2019).*

(Continued)

*Primary Examiner* — Ryan McCulley
(74) *Attorney, Agent, or Firm* — Oblon, McClelland, Maier & Neustadt, L.L.P.

(57) ABSTRACT

A computer vision method for generating a three dimensional reconstruction of an object, the method comprising:
  receiving a set of photometric stereo images of the object, the set of photometric stereo images comprising a plurality of images using illumination from different directions using one or more light sources;
  using a trained neural network to generate a normal map of the object; and
  producing a 3D reconstruction of said object from said normal map,
  wherein using said trained neural network comprises converting said set of photometric stereo images to an input form suitable for an input layer of said neural network, wherein said input form comprises, for each pixel, a representation of the different lighting directions and their corresponding intensities which have been obtained from photometric stereo images to which a compensation has been applied, the compensation being determined from an estimate of the distance between the lighting source and a point on the object to which the pixel corresponds.

27 Claims, 22 Drawing Sheets

(51) Int. Cl.
| | |
|---|---|
| G06T 17/00 | (2006.01) |
| G06K 9/62 | (2022.01) |
| G06N 3/08 | (2006.01) |
| G06T 7/00 | (2017.01) |
| G06T 7/586 | (2017.01) |

(52) U.S. Cl.
CPC ............. G06T 7/00 (2013.01); G06T 7/586 (2017.01); G06T 15/506 (2013.01); G06T 17/00 (2013.01); G06T 15/503 (2013.01)

(56) References Cited

OTHER PUBLICATIONS

Great Britain Search Report dated Jan. 19, 2021 in Great Britain Application 2012490.5 filed Aug. 11, 2020, 5 pages.

Ikehata, S., "CNN-PS: CNN-based Photometric Stereo for General Non-Convex surfaces," In ECCV, 2018, https://arxiv.org/abs/1808.10093, 16 pages.

Logothetis, F. et al., "Semi-calibrated Near Field Photometric Stereo," In CVPR, 2017, 10 pages.

Logothetis, F. et al., "A Differential Volumetric Approach to Multi-View Photometric Stereo," In ICCV, 2019, https//arxiv.org/abs/1811.01984, 10 pages.

Matusik, W. et al., "A Data-Driven Reflectance Model," ACM Transactions on Graphics, 2003, , 11 pages.

Shi, B. et al., "A benchmark dataset and evaluation for non-lambertian and uncalibrated photometric stereo," In: CVPR, 2016, 14 pages.

Burley, B. et al., "Physically-based shading at Disney," In: SIGGRAPH Course Notes, 2012, 27 pages.

Eigen, D. et al., "Predicting Depth, Surface Normals and Semantic Labels with a Common Multi-Scale Convolutional Architecture," Dept. of Computer Science, Courant Institute, New York University, Facebook AI Research, ICCV, 2015, 9 pages.

Zhang, Y. et al., "Physically-Based Rendering for Indoor Scene Understanding Using Convolutional Neural Networks," 2017 IEEE Conference on Computer Vision and Pattern Recognition, Jul. 21, 2017, 9 pages.

Office Action dated Oct. 4, 2022 in Japanese Patent Application No. 2021-041653, along with an English translation.

\* cited by examiner

| Object - Halloween | Shape - Proposed | Normal Error - Proposed |
|---|---|---|
|  |  |  |
| Object - Armadillo | | |
|  |  | |
| Object - Queen | | |
|  |  |   |

COMPUTER VISION METHOD AND SYSTEM

CROSS REFERENCE TO RELATED APPLICATION

This application claims the benefit of United Kingdom Application number 2012490.5 filed on Aug. 11, 2020 which is hereby incorporated by reference.

FIELD

Embodiments are concerned with a computer vision system and method for performing 3D imaging of an object.

BACKGROUND

Many computer vision tasks require retrieving accurate 3D reconstruction of objects from the way they reflect lights. However, reconstructing the 3D geometry is a challenge as global illumination effects such as cast-shadows, self-reflections and ambient light come into play, especially for specular surfaces. The power of convolutional neural networks in conjunction with computer graphics has been leveraged to cope with the need of a vast number of training data in order to invent the image irradiance equation and retrieve the object geometry from photometric stereo images. However, rendering global illumination effects is a slow process, which places a limitation on the training data that can be generated.

DETAILED DESCRIPTION

Figure 1:
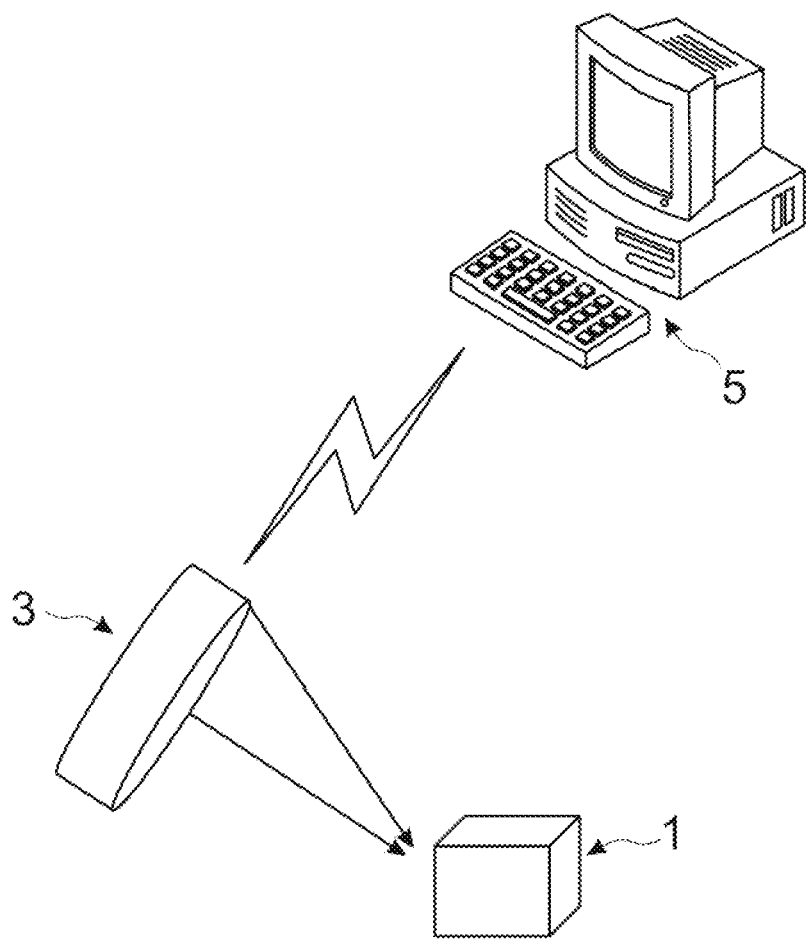
FIG. 1 is a schematic of a system in accordance with an example useful for understand of the current invention.

In an embodiment, a computer vision method for generating a three dimensional reconstruction of an object, the method comprising:
receiving a set of photometric stereo images of the object, the set of photometric stereo images comprising a plurality of images using illumination from different directions using one or more light sources;
using a trained neural network to generate a normal map of the object; and
producing a 3D reconstruction of said object from said normal map,
wherein using said trained neural network comprises converting said set of photometric stereo images to an input form suitable for an input layer of said neural network, wherein said input form comprises, for each pixel, a representation of the different lighting directions and their corresponding intensities which have been obtained from photometric stereo images to which a compensation has been applied, the compensation being determined from an estimate of the distance between the lighting source and a point on the object to which the pixel corresponds.

The disclosed method addresses a technical problem tied to computer technology and arising in the realm of computing, namely the technical problem of generating a three-dimensional reconstruction of an object or a scene. The disclosed method solves this technical problem by a neural network architecture, configured to receive as an input per-pixel illumination information derived from a set of photometric stereo images. The improvement is provided by the specific input form, which allows for using a fast-to-obtain training data while still allowing the network to learn global illumination effects and real-world imperfections.

The proposed method can provide the 3D reconstruction of an object using the photometric stereo technique in the near-field in conjunction with a neural network capable of predicting the geometry from the light reflected off the object.

In an embodiment, the input form is obtained from compensated photometric stereo images to which a compensation has been applied determined from the distance between the lighting source and a point on the object to which the pixel corresponds.

In the disclosed method is proposed the use of a neural network which has been trained for far-field operation but can be used to generate three-dimensional representation of an object or a scene placed in the near-field. The near-field photometric stereo images are compensated for the near-field light attenuation, allowing a neural network, trained on far-field images, to be used for recovering surface normals and subsequently generating a three-dimensional representation of the object or the scene. The photometric stereo images are compensated with an attenuation factor. The attenuation factor is estimated based on the distance between a point of the object or the scene and the camera.

In a further embodiment, once a normal map is generated by said trained network, a reconstruction of the object is obtained and this reconstruction of the object is then used to produce an updated input form and a further normal map is generated from the updated input form.

In a further embodiment, the process of producing a normal map is an iterative process wherein successive reconstructions of the object are used to produce updated input forms until convergence of the reconstruction of the object.

The proposed method employs iterative refinement technique for reconstructing the three-dimensional representation of the object. An initial rough estimate of the object geometry is obtained.

The initial object estimate, which may comprise a depth map with constant values is used for the initial compensation of the set of photometric stereo images. The compensated images are then converted to an input form, which is processed by the neural network to generate the surface normals. The surface normals are used to reconstruct the object. The obtained object reconstruction is used as the new estimate of the object geometry for the next iterative step.

In the next iterative step, the set of photometric stereo images is compensated based on the new estimate of the object geometry.

In a further embodiment, the input form comprises a plurality of observation maps, wherein an observation map is provided for each pixel, each observation map comprising a projection of the lighting directions onto a 2D plane, the lighting directions for each pixel being derived from each augmented photometric stereo image.

In a further embodiment, the observation maps of the plurality of observation maps are updated by compensating the photometric stereo images using the latest reconstruction of the object.

In a further embodiment, the photometric stereo images are compensated for real-world illumination effects, the compensation amount being derived from the latest reconstruction of the object.

In a further embodiment, the compensation amount is based on a 3D coordinates of a point on the latest reconstruction of the object.

In a further embodiment, the compensation amount is provided by:

$$\alpha_m(X) = \phi_m \frac{(\hat{L}_m(X) \cdot \hat{S}_m)^{\mu_m}}{\|L_m(X)\|^2}$$

where $\alpha_m(X)$ is the attenuation factor, X is 3D surface point coordinates of a point, the point coordinates expressed as $X=[x, y, z]^T$, $\phi_m$ is the intrinsic brightness of light source m, $S_m$ is a principle direction of point light source, $\mu_m$ is an angular dissipation factor, and $\hat{L}_m(X)$ is a lighting direction, the lighting direction defined as $L_m(X)/\|L_m(X)\|$.

In a further embodiment, the observation maps for each pixel are a three-dimensional map comprising a plurality of channels.

In a further embodiment, at least one of the plurality of channels of the observation map comprises information from which a viewing vector for said pixel can be derived.

In a further embodiment, the plurality of channels of the observation maps comprise at least one of viewing vector components $\hat{V}_x$ or $\hat{V}_y$.

In an embodiment, a method of training a model is provided, the model for generating a three dimensional (3D) reconstruction of an object, the model comprising:

a conversion stage to convert a set of photometric stereo images to an input form suitable for an input of said model, wherein said input form comprises, for each pixel, a representation of the different lighting directions and their corresponding intensities which have been obtained from photometric stereo images to which a compensation has been applied, the compensation being determined from an estimate of the distance between the lighting source and a point on the object to which the pixel corresponds;

a first processing stage to process the input form with a neural network processing stage to produce a normal map of the object; and a second processing stage to process the normal map of the object to produce an output 3D reconstruction of said object, wherein the set of photometric stereo images comprises a plurality of images using illumination from different directions using one or more light sources;

the training method comprising:

providing training data, the training data comprising a set of photometric stereo images of an object and 3D reconstruction of said object; and training said model using the training data set of photometric stereo images as the input and comparing the generated output to the 3D reconstruction.

In a further embodiment, the input form comprises a plurality of observation maps, wherein an observation map is provided for each pixel, each observation map comprising a projection of the lighting directions onto a 2D plane, the lighting directions for each pixel being derived from each photometric stereo image.

In order to avoid any limitations in terms of combination among material, light and normal directions, the proposed network is trained using per-pixel rendered observation maps. The observations maps are rendered using independent per-pixel renderings and using parameters sampled from synthetic datasets. The observation maps are sampled so that they cover different material and light configurations. The observation maps allow the process of rendering a huge amount of various training data to be greatly simplified. The simplification is achieved by rendering on a pixel basis, rather than rendering full objects, which is a relatively slow and inefficient process, as there is a large amount of correlation among neighbouring pixels, especially for shadows and self-reflection patterns.

The proposed network only benefits from the simplified training data rendering and the increased training data variation. The combinations of sampled materials, lights and normal directions is maximised, by using the per-pixel rendered observation maps to train the proposed network. As the training of the proposed network is performed on a variety of different materials, the 3D reconstruction process of the object geometry is performed with accuracy if the material of the object has been among the materials on which the network has been trained.

In an embodiment, the proposed network is trained on specific materials. For example, in 3D printing applications, training the network on specific materials allows the system to be adapted to the material used by the 3D printer in the printing process, and thus the network can achieve higher accuracy of the reconstruction process of the object.

The training methods is further simplified by constraining the light directions to be uniform and most importantly to have the same directions during training and test.

In a further embodiment, the observation maps are obtained from augmented photometric stereo images to which compensation has been applied determined from the distance between the lighting source and a point on the object to which the pixel corresponds.

The observation maps are rendered based pixel information which is sampled from synthetic dataset. Furthermore, it order for the proposed method to be able to accurately predict 3D shapes of highly specular objects, the observation maps are rendered based on parameters for a variety of materials In a further embodiment, the plurality of observation maps are augmented to include real world illumination effects.

In a further embodiment, the plurality of observations maps are augmented to include at least one of cast shadows; self-reflections; surface discontinuity; ambient light; light source brightness and noise.

The proposed network gains robustness to deviations from the irradiance equation such as global illumination effects if the training data, used for the training of the network, includes said illumination effects. Therefore, during training the observation maps are augmented to include various real-world illumination effects, allowing the network to learn to recognise said effects.

Given the pixel-wise type of rendering using synthetic parameters, the lack of global physical effects is compensated by augmenting the observation maps for training of the network with a set of realistic effects including light source brightness variation, ambient light, cast shadows, self-reflections and reflectance mixing in discontinuity boundaries. Thus, the broad augmentation strategy of the observation maps is used to reduce the synthetic to real gap in the observation map space.

In a further embodiment, the augmented photometric stereo images are provided by:

$$j_m = D\left(\frac{1}{t}\sum_{k=1}^{t}(w^k(\emptyset_m * b_m^k + r_H^k - r_L^k)s_m^k + r_L^k)n_{M,n}^k + n_{A,m}^k\right)$$

wherein $j_m$ is the augmented pixel value for light source m, D is the discretisation and saturation function, w is a weight value, $\emptyset_m$ is the intrinsic light source brightness, b is base reflectance, $r_H$ and $r_L$ are the self-reflection constants, s is cast shadow binary variable, $n_A$ is additive noise, and $n_M$ is multiplicative noise, k is indicative of discontinuity compensation components, t is a sampling multiple.

In a further embodiment, the observations maps are provided for each pixel based on an augmented ground truth three-dimensional coordinate of a point of the object to which the pixel corresponds.

In an embodiment, there is provided a system for generating a three dimensional (3D) reconstruction of an object, the system comprising an interface and a processor:

the interface having an image input and configured to receive a set of photometric stereo images of an object, the set of photometric stereo images comprising a plurality of images using illumination from different directions using one or more light sources, the processor being configured to:
convert a set of photometric stereo images to an input form suitable for an input of said model, wherein said input form comprises, for each pixel, a representation of the different lighting directions and their corresponding intensities which have been obtained from photometric stereo images to which a compensation has been applied, the compensation being determined from an estimate of the distance between the lighting source and a point on the object to which the pixel corresponds;

process the input form with a neural network processing stage to produce a normal map of the object; and process the normal map of the object to produce an output 3D reconstruction of said object.

In an embodiment, there is provided a quality control system, the quality control system comprising the system for generating a three dimensional (3D) reconstruction of an object and being adapted to receive a set of photometric stereo images of a manufactured object and generate a three-dimensional (3D) reconstruction of the manufactured object.

FIG. 1 shows a schematic of a system useful for the understanding of the current invention. The system can be used to capture three-dimensional (3D) image data of an object, and to reconstruct the object. As used herein, the term "object" will be used to denote what is being imaged. However, it is to be understood that this term could cover a plurality of objects, a scene, or a combination of objects and a scene et cetera.

In the example useful for understand of the current invention, the 3D image data of object 1 is captured using apparatus 3. Further details of apparatus 3 will be provided in reference to FIG. 2.

The 3D image data captured by apparatus 3 is provided to computer 5, where it is processed. In FIG. 1, the computer 5 is shown as a desktop computer, however, it is to be understood that it can be any processor, for example, a distributed processor or a processor of a mobile phone et cetera. Details of an example processor will be described further below in this description with reference to FIG. 24.

The system of FIG. 1 can be provided in an existing hardware setup and be used for quality control of the processes of said setup. Such setups include but are not limited to 3D printing setups and industrial pipelines. For example, the system of FIG. 1 can be provided in a 3D printer setup, where the system is used to perform quality control of the printing process. More specifically, the system can be used to capture photometric stereo images of intermediate results of the printing process, and confirm the proper executing of the printing process. Furthermore, the system 1 can be implemented as a handheld device used by a user to obtain 3D models of everyday objects.

Figure 2:
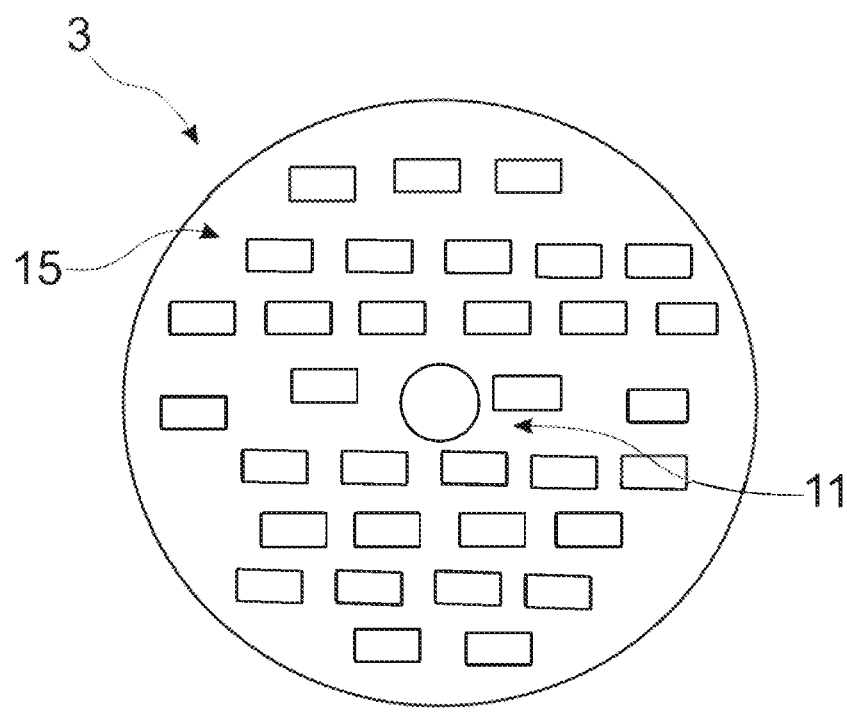
FIG. 2 is a schematic showing an arrangement of a camera and light sources for performing 3D imaging of an object.

FIG. 2 shows an exemplary arrangement of apparatus 3 of FIG. 1. The Figure shows a mount that holds camera 11 and a plurality of light sources 15 in a fixed relationship with one another and camera 11. This arrangement of apparatus 3 allows camera 11 and the plurality of light sources 15 to be moved together maintaining constant separation from each other.

In the specific exemplary arrangement of apparatus 3, the light sources 15 are provided surrounding camera 11. However, it is understood that the light sources 15 and camera 11 can be provided in a different arrangement. Camera 11 is used together with light sources 15 to obtain photometric stereo data of object 1. Individual light sources 15 are activated one after another to allow the camera 11 to capture photometric stereo data.

In a particular arrangement of apparatus 3, a FLEA 3.2 Megapixel camera provided with a 8 mm lens is used as camera 11. The camera 11 has an 8 mm lens and is rigidly attached to a printed circuit board. The printed circuit board further comprises 16 white bright LEDs arranged in a co-planar fashion with the image plane and provided surrounding camera 11 at a maximum difference of 6.5 centimetres.

Apparatus 3 may be used to capture photometric stereo images of an object. The object is positioned in front of the camera within the depth range of the camera. The depth range, also referred to as the depth of field (DOT), is a term used to denote the range of distances between the camera and the object at which the object is in focus. If an object is too close or too far to the camera outside the depth range of the camera, the object gets out of focus and details cannot be resolved. For example, the camera 11, equipped with 8 mm lens, may have depth range of between 5 and 30 centimetres.

Light sources 15 are individually activated on after the other to allow camera 11 to capture photometric stereo data of the object under different lighting conditions. This is achieved by switching on just one light source at a time. However, it is also understood that the light sources 15 can be activated in various fashions and combinations. For example, the apparatus 3 may comprises 16 LEDs and thus a set of 16 photometric stereo images may be captured.

Figure 3:
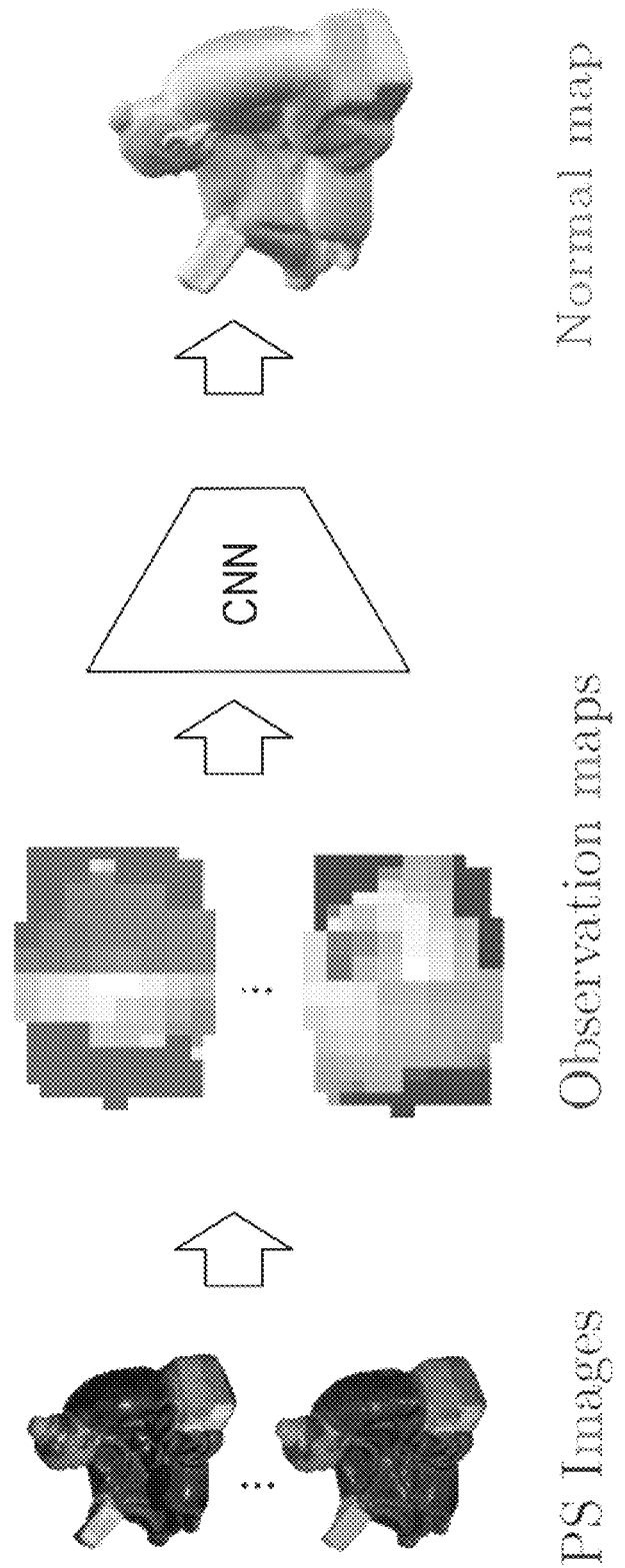
FIG. 3 is a high level schematic of method of a method for recovering surface normals from a set of photometric stereo images of an object or a scene.

FIG. 3 shows a high-level diagram of the basic steps of the method for recovering surface normals from a set of photometric stereo images of an object or a scene, which can take into account near-field optical effects.

Images of an object are obtained using apparatus 3 following the above-described procedure. Alternatively, the photometric stereo images can be obtained from a remote photometric stereo imaging apparatus, communicated to the computer 5 and thus provided as an input.

For each pixel of the photometric images, an observation map is rendered by combining the pixel observations of all photometric images onto a simple observation map. Subsequently, the observation maps are process by the Convolutional Neural Network (CNN), which generates a normal (orientation) map.

Figure 4:
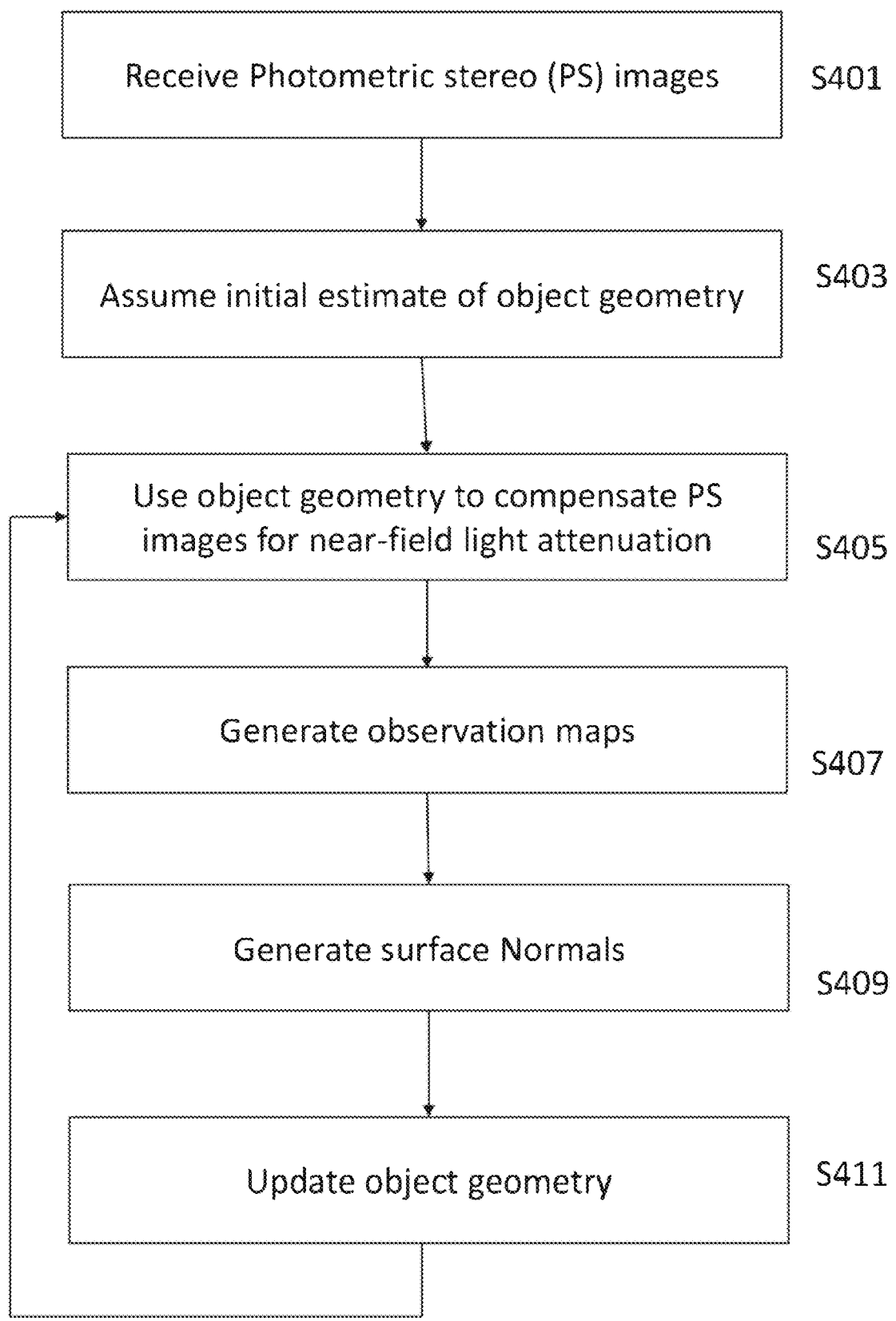
FIG. 4 a flow diagram of the method for recovering surface normals from a set of photometric stereo images of an object in accordance with an embodiment.

FIG. 4 shows a flow diagram of the method for recovering surface normals from a set of photometric stereo images of an object placed in the near-field.

In Step S401, a set of photometric stereo images of an object are provided as an input. The set of photometric stereo images comprises m number of images, where the number of images corresponds to the number of light sources used. Each image $i_{j,p}$ for j=1, . . . , m, can be seen as a set of pixels p. For each of the m light sources, the direction $L_j$, and the brightness $\emptyset_j$ are known and are used in the calculation of the normals $N_p$.

In Step S403, an initial estimate of the object geometry is obtained and a depth map is initialised based on the initial object geometry.

As explained above in relation to FIG. 2, the object is placed within the depth range of the camera of the capturing apparatus, and the distance (i.e. depth z) between the object and the camera is approximately measured with a ruler. The depth map is then initialised by setting the depth of all points to a constant value, as estimated with the ruler or other method of estimating the mean distance from the camera to the object. The specific method of initialisation is not important. Other methods of initialising the depth could be used, for example, using a cad model, kinect type depth sensor, etc The method for recovering surface normals from a set of photometric stereo images of an object placed in the near-field, as currently described in relation to FIG. 3, involves numerous iteration. After each iteration the estimate of the object geometry is updated, as it will be explained further below, and the newly updated estimated is used for the next iteration. While it is understood that the depth can be more accurately estimated using other methods and devices, such as depth sensors, the fact that the method converges from such a simple estimate obtained using a ruler, renders the more sophisticated methods unnecessary and overcomplicating the design of the proposed system. The addition of any further sophistications in the estimation of the initial object geometry could, however, reduce the run time by of the method by a single iteration.

In Step S405, the initial estimate of the object geometry is used in conjunction with the photometric stereo images to compensate for near-field light attenuation.

The near-field light attenuation is modelled using the following non-linear radial model of dissipation $$\alpha_m(X) = \emptyset_m \frac{(\hat{L}_m(X) \cdot \hat{S}_m)^{\mu_m}}{\|L_m(X)\|^2} \quad (1)$$

where $\emptyset_m$ is the intrinsic brightness of the light source, $S_m$ is the principle direction denoting the orientation of the LED point light source, $\mu_m$ is an angular dissipation factor, and the lighting direction is expresses as $$\hat{L}_m(X) = \frac{L_m(X)}{\|L_m(X)\|} \quad (2)$$

It is assumed calibrated point light sources at positions $P_m$ with respect to the camera centre at point 0, which results in variable lighting vectors $L_m = P_k - X$, where X is the 3D surface point coordinates and is expressed as $X = [x, y, z]^T$.

Defining the viewing vector $\hat{V}$ as $$\hat{V} = -\frac{X}{\|X\|} \quad (3)$$

the general image irradiance equation is expressed as $$i_m = \alpha_m B(N, L_m, \hat{V}, \rho) \quad (4)$$

where N is the surface normal, B is assumed to be a general bidirectional reflectance distribution function (BRDF) and $\rho$ is the surface albedo, where the albedo $\rho$ and the images are RGB and the reflectance is different per channel, thus allowing for the most general case. Furthermore, global illumination effects such as shadows and self-reflections could also be incorporated into B.

While the photometric stereo images are RGB images, a pre-processing may be performed, not shown in the Figure, where the RGB channels are averaged and thus the images are converted to gray-scale images. In the pre-processing stage, the photometric stereo images are also compensated with the intrinsic light source brightness, where the intrinsic light source brightness $\emptyset_m$ is a constant property of each LED. The resultant image values are referred to as the RAW gray image values and are included in the observation maps as discussed further below in this specification.

The general image irradiance equation can be thus rearranged into a BRDF inversion problem, as:

$$j_m = \frac{i_m}{\alpha_m} = B(N, L_m, \hat{V}, \rho) \quad (5)$$

where $j_m$ denotes the BRDF samples, It should be noted that the viewing vector $\hat{V}$ is known but due to the non-linear dependence on the distance between the object and the photometric stereo capturing device, denoted by depth z, the lighting direction $L_m$ and near-field light attenuation $\alpha_m$ are unknowns. The objective of the convolutional neural network, is therefore to solve the inverted BRDF problem in the general viewing direction, which is input into the network through the $3^{rd}$ and $4^{th}$ channels of the map as explained further below, and recover the surface normals N and subsequently the depth z.

Having assumed an initial estimate of the depth z (local surface depth) of each pixel, the near-field attenuation $\alpha_m(X)$ can be computer following equation 1, and thus the equivalent far-field reflectance samples $j_m$, representing the observations in the photometric stereo images after the compensation for the near-field attenuation, can be obtained using the first part of equation 5. The second part of equation 5 is modelled by the CNN, and is used to approximate the normals N.

In Step S407, the set of equivalent far-field reflectance samples $j_m$ is used to generate observation maps which are consequently provided to the input of a Convolutional Neural Network (CNN) which is used to calculate surface Normals N. Each equivalent far-field reflectance sample $j_m$ comprises a set of pixels $x=\{x_1, \ldots, x_p\}$, where for each sample $j_m$, m denoting the number of light sources and thus the number of samples in the set of equivalent far-field reflectance samples, the light directions $L_m$ and the brightness $\emptyset_m$ are known and used in the estimation of the surface normals N(x) for each pixel x.

The observation maps are computer by combining the information from all the light sources into a single map. In particular, for each pixel x, all observations in the set of equivalent far-field reflectance samples $j_m$, are merged into a single d×d observation map.

Initially normalised observations $\hat{j}_{m,p}$ for each pixel x are computed. Normalising the observations is performed by compensating for the variation in the light sources brightness $\emptyset_m$ and dividing with the maximum brightness for all light sources m:

$$\hat{j}_{m,p} = \frac{j_{m,p}}{max_m [i_{m,p}/\emptyset_m]} \quad (6)$$

Compensating for the light sources variations is aimed to compensate for the albedo variation of the different pixels. Consequently, this also results in a reduced range of the data associated with the observations of each pixel.

Subsequently, the normalised observations $\hat{j}_{m,p}$ (x) for each pixel x are placed onto a normalised observation map $O_n$. The normalised observation map is a square observation map with dimensions d×d. In certain embodiments, d is 32. The size of the observation maps is independent from the number or size of the photometric stereo images used.

The normalised observations are mapped onto the normalised observation map by projecting the light source direction $L_m = [1_m^x, 1_m^y, 1_m^z]$ to the d×d map, following the below equation:

$$O_n\left(\left[d\frac{l_m^x+1}{2}\right], \left[d\frac{l_m^y+1}{2}\right]\right) = \hat{j}_{m,p} \quad (7)$$

In certain instances, the normalised observation data may be corrupted by the division operation. For example, corruption of the normalised observation data may be occur when the maximum value of the observations is saturated. Division with a saturated value results in an overestimate in the normalised observation values. In other instances, the division of very dark points in the observations becomes numerically unstable and any amount of noise or any discrimination inaccuracies are amplified.

Therefore, the d×d observation map for each pixel x is extended to a three-dimensional observation map with dimensions d×d×2 by the addition of a RAW channel map, $O_r$. The RAW channel map may be a RAW grey scale channel map. The RAW channel map is defined as follows:

$$O_r\left(\left[d\frac{l_j^x+1}{2}\right], \left[d\frac{l_j^y+1}{2}\right]\right) = i_j(x)/\emptyset_j \quad (8)$$

The d×d×2 observation map, denoted by O below, is created by concatenation operation on the third axis of the normalised observation map $O_n$ and the RAW channel map $O_r$:

$$O=[O_r;O_n] \quad (9)$$

In certain embodiments, the observation maps O, with dimensions d×d×2 can be extended to d×d×4 observation maps, by augmenting the observation map to include two additional channels, being constant to the first two components of the viewing vector and $\hat{V}_x$ and $\hat{V}_y$, respectively. The components $\hat{V}_x$ and $\hat{V}_y$ are scalar components and fully determine the viewing vector $\hat{V}$, which itself is used in BRDF inversion problem equation.

The observation maps record the relative pixel intensities from the BRDF samples on a 2D grid of discretised light directions. The observation map representation is highly convenient representation for use with classical CNN architectures as it provides 2D input for a pixel length despite the potential varying number of lights and hence photometric stereo images used.

In Step S409, the observation maps for each pixel x are provided to the input of the CNN, which is used to solve the BRDF inversion problem, and calculate the surface normals for each point based on the relative pixel intensities in the observation maps. As the CNN is designed to be robust to real world effects, the modelled BRFD inversion problem equation is an inexact representation of the BRDF inversion problem equation.

Figure 5:
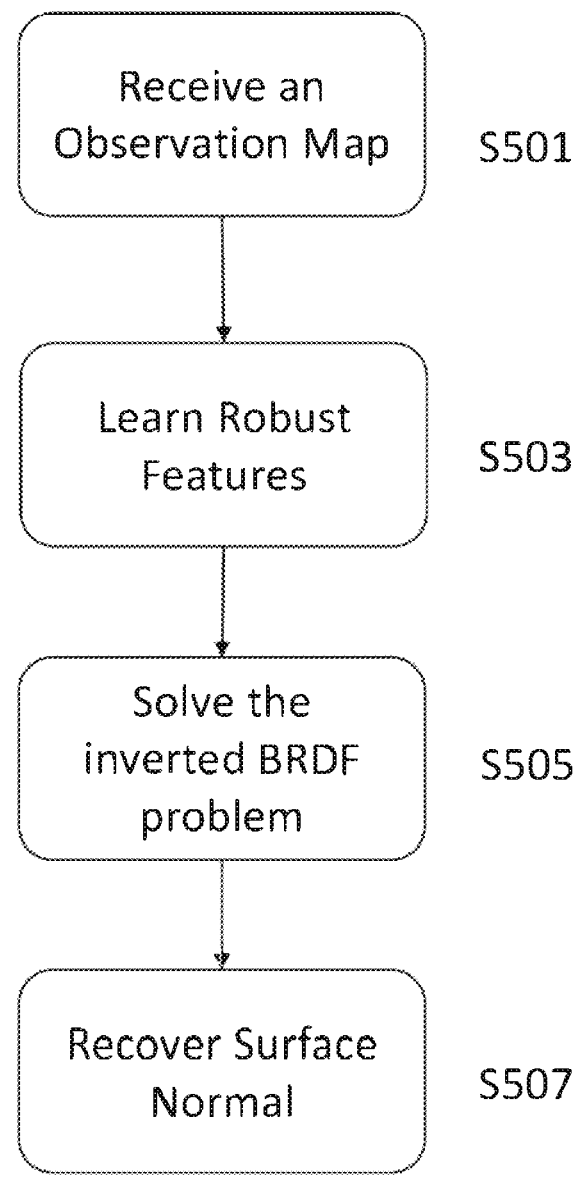
FIG. 5 is a high-level flow-diagram of convolutional neural network used for generating surface normals from observation maps.

A high-level flow-diagram of convolutional neural network used for generating surface normals from the pixel-wise observation maps is presented in FIG. 5.

The network comprises 7 convolutional layers which are used to learn robust features for dealing with real world data, Step S503. This is done by employing an augmentation strategy during training of the network, as discussed further down in this specification. The network further comprises 2 fully connected layers, and a fully connected layer in combination with a logarithm layer at the end, which is used to solve the inverse BRDF problem, and hence compute a surface normal for each pixel, Steps S505 and S507.

Figure 6:
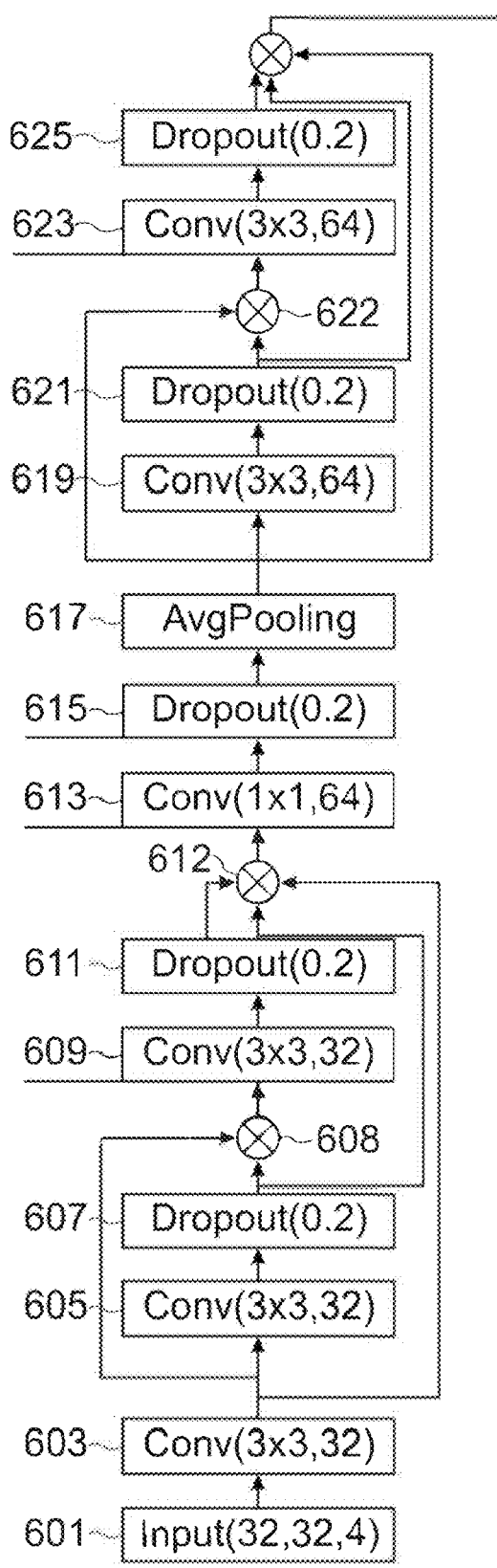
FIG. 6 is a diagram of the architecture of a convolution neural network for generating surface normals from observation maps.
Figure 6:
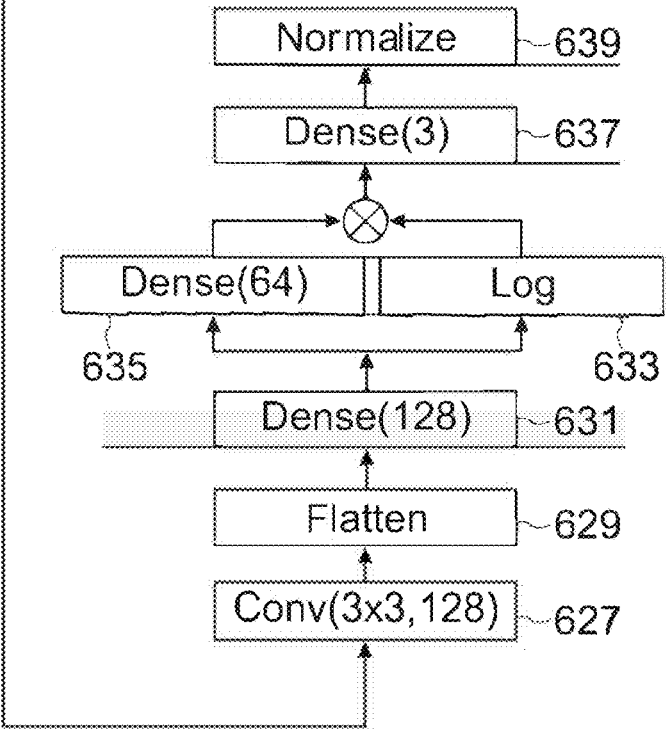

The network has around 4.5M parameters in total. A full diagram of the architecture of the network is shown pictorially in FIG. 6. While FIG. 6 present a specific network architecture, it is understood that different neural network architectures can be used for estimating surface normals from observations maps.

The proposed network comprises a single branch network. The 7 convolutional layers 603, 605, 609, 613, 619, 623, and 627 and the first two fully connected layers 631 and 635 are each followed by a RELU activation function. The size of the convolutional filter of each of the convolutional layers is denoted in FIG. 6, and thus the size of the output volume for each layer can be inferred. In particular, the convolutional layer 603, comprises 32 convolutional filters with dimensions (3×3) and outputs an output volume with dimensions (32, 32, 32); convolutional layer 605 comprises 32 convolutional filters with dimensions (3×3) and outputs an output volume with dimensions (32, 32, 32). The output volume of the first concatenation layer 608 has dimensions of (32, 32, 64). The convolutional layer 609 comprises 32 convolutional filters with dimensions (3×3) and outputs an output volume with dimensions of (32, 32, 32). The output volume of the second concatenation layer 612 has dimensions (32, 32, 96). Convolutional layer 613 comprises 64 convolutional filters with dimensions (1×1) and outputs an output volume with dimensions (32, 32, 64). The output volume of the average pooling layer 617 has dimensions of (16, 16, 64). The convolutional layer 619 comprises 64 convolutional filters with dimensions of (3×3) and outputs an output volume with dimensions (16, 16, 64). The output volume of the third concatenation layer 622 has dimensions (16, 16, 128). The convolutional layer 623 comprises 64 convolutional filters with dimensions (3×3) and outputs an output volume with dimensions of (16, 16, 64). Convolutional layer 627 comprises 128 filters with dimensions (3×3) and outputs an output volume with dimensions of (16, 16, 128).

Furthermore, after convolutional layer 605, 609, 613, 619 and 623, dropout layers 607, 611, 615, 621 and 625 respectively, are used. Dropout is a training approach which reduces the independent learning amongst the neurons in the network. During training a random set of nodes is dropped out of the network, so that a reduced version of the network is created. The reduced version of the network learns independently of other sections of the neural network and hence prevents neurons from developing co-dependency amongst one another.

Each dropout layer is associated with a dropout parameter that specifies the probability at which outputs of the layer are dropped out. In layers 607, 611, 615, 621 and 625, the dropout parameter is 0.2 and thus 20% of the parameters are dropped out.

Skip connection are also employed in the network architecture to speed up convergence. Skip connections are used in order to allow the output of convolutional layers to skip proceeding layers and to allow for the outputs of subsequent layer to be concatenated together, before being provided as in input to the next layer of the network. Average pooling layer 617 is also employed.

The first part of the convolutional neural network, comprising the 7 convolutional layers 603, 605, 609, 613, 619, 623, and 627, is effectively separated from the second part of the network, comprising the fully connected layers 631, 635, 637 and the logarithmic layer 633, by a Flattening layer 629. Fully connected layers are used because they provide good approximation of non-linear mathematical functions.

Flattening layer 629 rearranges the feature maps, output by convolutional layer 627, into a vector of input data that is provided to the first fully connected layer 631. The output volume of convolutional layer 627, is flattened into a 32,768 element vector, which is provided to the first fully connected layer 631.

The BRDF model, described above in this specification, follows the Blinn-Phong reflectance model which is considered to be a good approximation of many real BRDFs, where the BRDF is modelled as a summation of a diffuse component and an exponential component. Therefore, in order to solve the inverse BRDF problem, the inverse of these operations is approximated as a combination of a linear and logarithmic summation. The combination of the linear and logarithmic summation is implemented in the CNN using the combination of dense layer 635 and logarithmic layer 633. Dense layer 635 represents the linear component of the summation and the logarithmic layer represents the logarithmic component of the summation.

Finally, a normalized layer 639 is used to convert the extracted by the network features to a unit vector—the surface normal of the pixel and thus the network outputs a surface normal from the pixel-wise observation map input.

Referring back to FIG. 4, once the surface normals for all the pixels are calculated and a normal map of the object is generated, in Step S411, the normals are integrated and hence a corresponding depth map z is calculated.

The depth map is then used as a new estimate of the object geometry and is used for the next iteration, where step S405 to S411 are repeated for a plurality of iterations until a satisfactory result is obtained. The process of assuming an initial depth estimate and refining the depth estimate over a number of iterations is called iterative refinement of depth and normals. As the BRDF samples $j_m$ depend on the unknown depth, they cannot directly be computed before being provided as input to the CNN. Therefore, an iterative scheme, where the previous estimate of the object geometry is used, is employed. Using a previous estimate of the object geometry, the near-to-far field conversion is performed, and hence the BRDF samples are generated. A normal map is obtained from the BRDF samples by the CNN, and through numerical integration of the Normal map, a new estimate of the object geometry (depth map) is obtained. The numerical integration is an iterative ADMM process with a $l_1$ loss function. The variation optimisation includes Tikhonov regulariser $z=z_0$ (weight $\lambda=10^{-6}$).

Figure 7A:
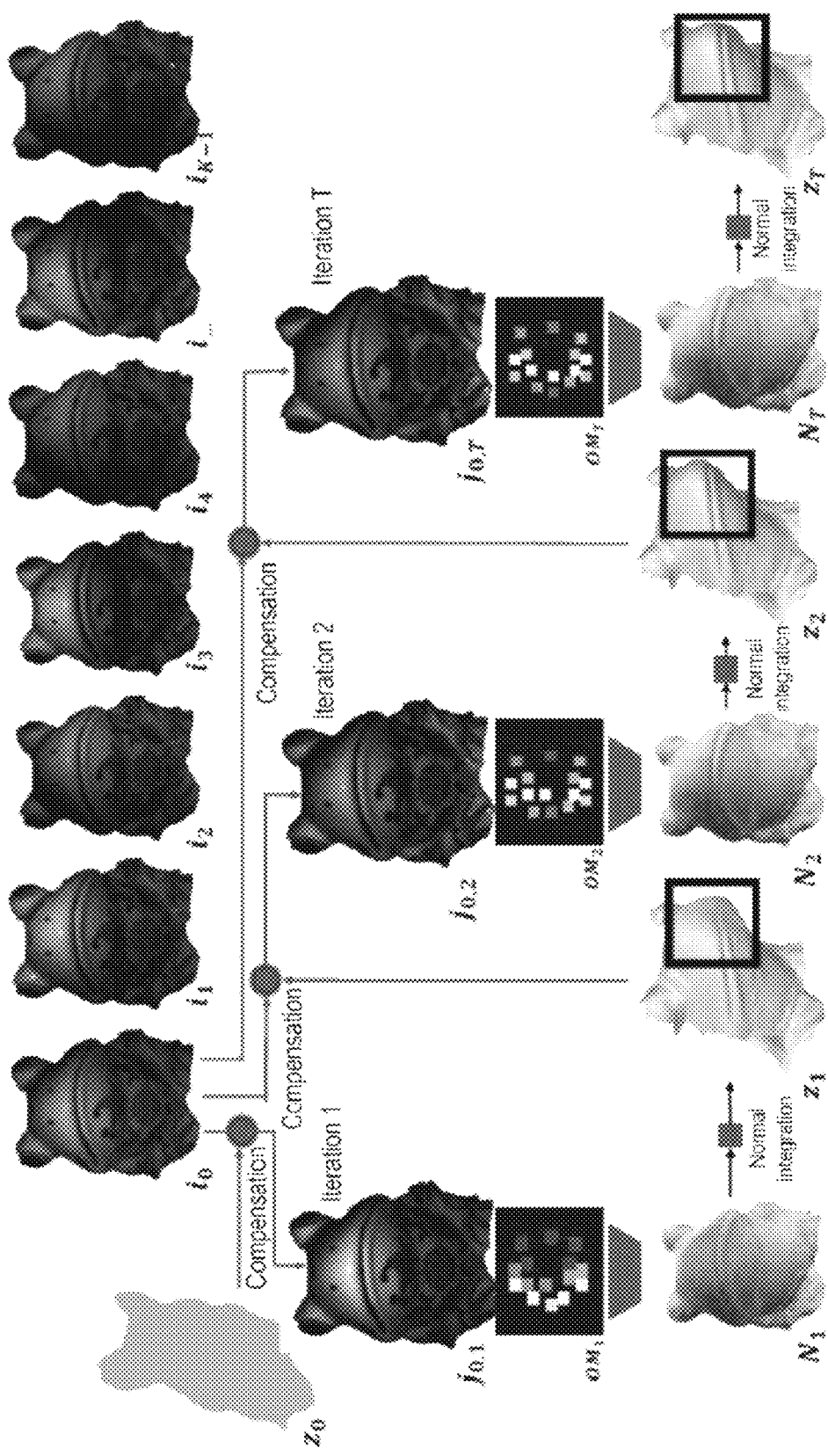
FIG. 7A is a schematic illustration of a iterative refinement process for generating surface normals.

The above-described process of iterative refinement is shown in FIG. 7A. The Figure shows 3 iterations of the above-described process. In iteration 1, an initial estimate of the object geometry, denoted by depth map $z_0$ in the Figure, is assumed and used to compensate the set of photometric stereo images $i_0 \ldots i_{k-1}$ for the near-field attenuation, and thus to create the first set of BRDF samples $j_{0,1}$.

In the next step, the pixel-wise observation maps $OM_1$ are generated for each pixel of the BRDF samples, and the observation maps are provided to the input of the convolutional neural network, which generates Normal map $N_1$. Subsequently, the corresponding depth map $Z_1$ is calculated using numerical integration. With this, the first iteration of the process is concluded.

In the next iteration, the depth map $Z_1$ is assumed to the new estimate of the object geometry and the same process is repeated again for a total of T number of iterations.

In the Figure, it can be seen how from a very rough estimate of the object geometry, the iterative process converges and obtains an accurate estimate of the object geometry, placed in the near-field, only after 3 iterations.

Figure 7B:
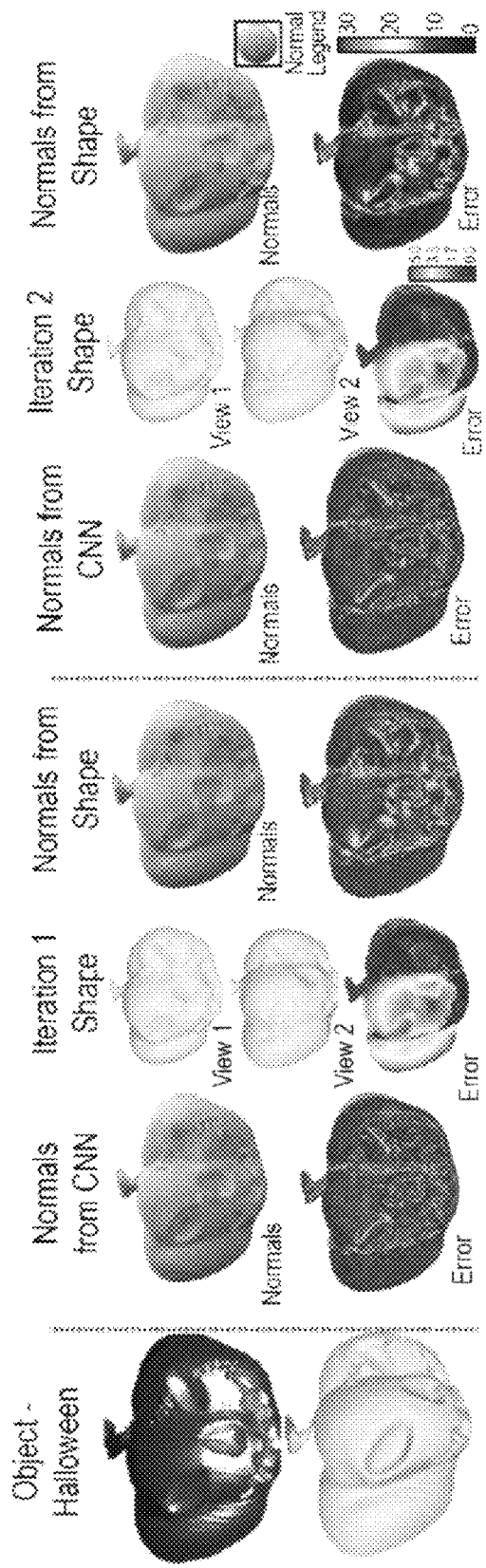
FIG. 7B is a schematic illustration of a iterative refinement process for generating surface normals.

FIG. 7B shows the iterative refinement of the geometry of the synthetic object HALLOWEEN. On the left, a sample image and the ground truth are shown. The Figure also shows 2 steps of the iterative refinement process with the respective normals, both raw network predictions and differentiated ones, normal error maps and depth error maps. As the difference between the results of the first iteration and the second iteration, the process is converged.

Figure 8:
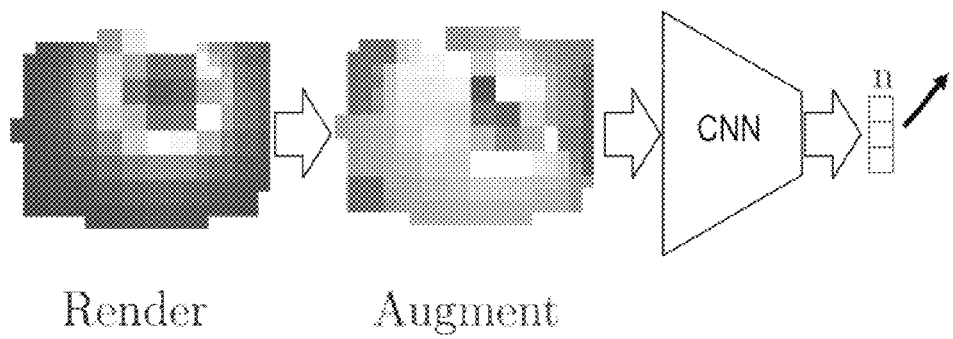
FIG. 8 is a high-level flow-diagram of a training method for a network for generating surface normals from observation maps.
Figure 9:
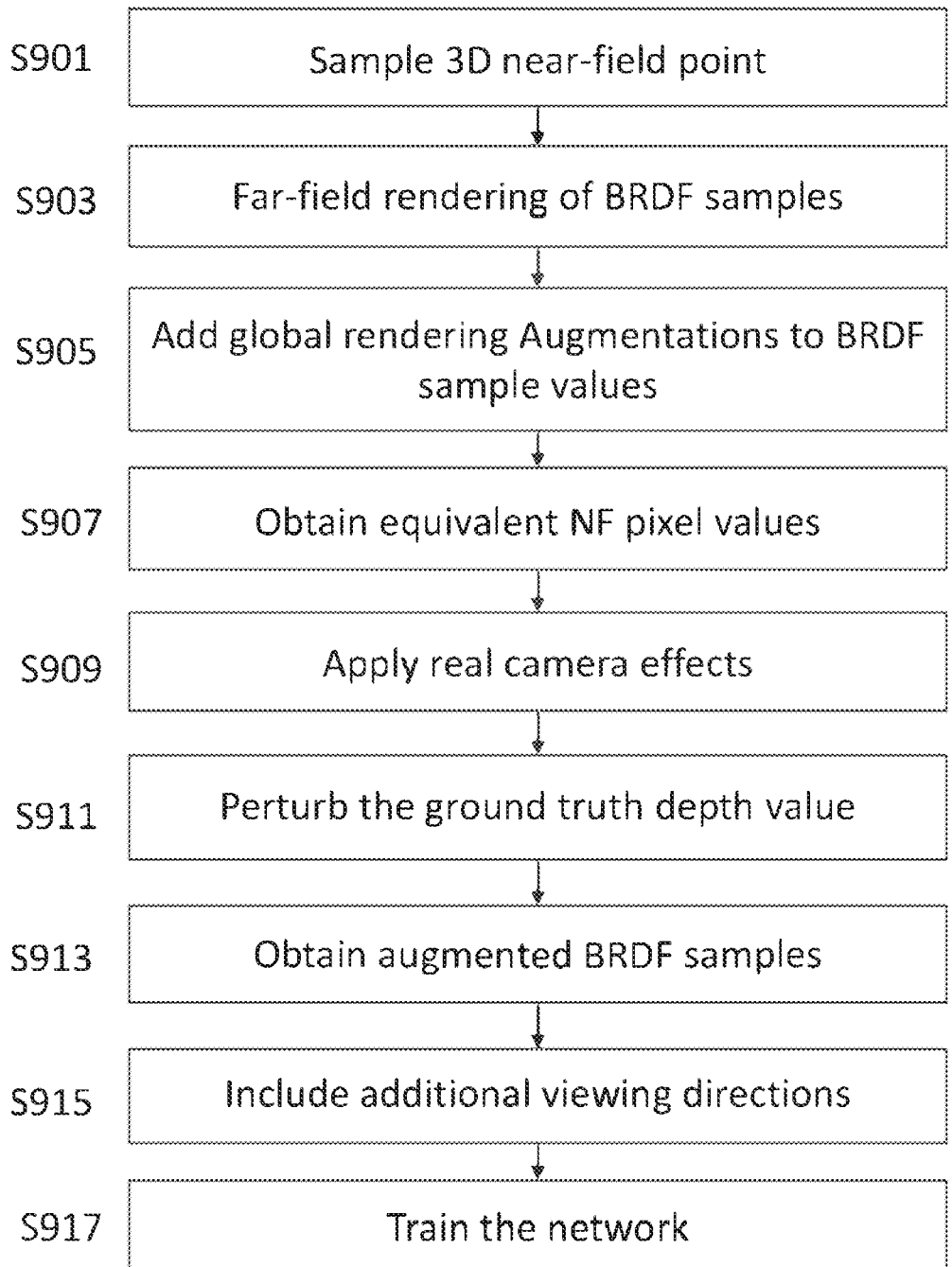
FIG. 9 is a high-level flow-diagram of a training method for a network for generating surface normals from observation maps.

FIG. 8 illustratively shows a procedure for training the proposed network for computing surface normals from pixel-wise observation maps. The training procedure can be effectively divided into two parts. First, the observation maps are rendered from the synthetic dataset and are augmented to include real world imperfections. Secondly, the Convolutional neural network is trained to estimate surface normals from the augmented synthetic observation maps. This process will now be described in more detail in relation to FIG. 9.

In order for the network to solve the near-field problem for a specific capturing setup, the training procedure is designed to only sample observation maps which are plausible at test time. In Step S901, the location [x, y, z] of a 3D point inside the camera frustrum (the field of view of the camera at a certain range of distances) is sampled to determine the near-field parameters of said point, and in particular the distance of the point from the light sources. This is required in order to be able to compute the exact lighting directions and the near-field attenuation.

For said 3D point, normal and material are sampled independently. Both Normal and material are intrinsic surface parameters which remain the same in the far field and in the near field. The intrinsic brightness of the light sources is known and is not sampled in the near-field. It is also assumed to be constant during the training process.

After the near-field parameters are sampled, a far-field rendering process is performed using a renderer and thus pixel-wise BRDF pixel values $j_m$ (normals, lights, viewing, material) are rendered for the different lights, Step S903. For example, the Disney BRDF renderer [B. Burley] may be used. In addition, the MERL real BRDF reflectance database [W. Matusik, H. Pfister, M. Brand, L. McMillan: "A data-driven reflectance model." ACM Transactions on Graphics (2003)] can be used in the rendering process to reflectance parameters under various N, L, V configurations.

In Step S905, a global rendering augmentation strategy is employed, and the BRDF pixel values are augmented to include global illumination effects namely cast-shadows, self-reflections, indirect illuminations, light-source brightness, ambient light, surface discontinuity and mixing. The global rendering augmentation strategy will be discussed further down in this specification.

In Step S907, the near-field parameters for the sampled 3D point are used to estimate the coefficient of the ground truth light attenuation $\alpha_{gt}$ in the near-field using Equation 1. The augmented BRDF samples values are multiplied by the estimated attenuation coefficient $\alpha_{gt}$, and thus the corresponding near-field pixel values are obtained, Equation 5.

In Step S909, real camera effects are applied to the near-field pixel values and thus are obtained near-field pixel values $i_m$. The real camera effects include discretisation, pixel saturation and noise. How these effects are modelled is discussed further down in this specification.

In order to get robustness to imprecise depth initialisation at test time, in Step S911, the ground truth depth value z is perturbed by ~dz, and thus essentially the ground truth location of the 3D point are scaled by a factor of $$\frac{(z+dz)}{z}.$$

This change in the ground truth depth causes a non-linear change to the attenuation from $a_{gt}$ to $a_{aug}$. The light directions $\hat{L}$, which determines the sparsity pattern of the observation maps, FIG. 10) is also slightly perturbed. This process is illustratively shown in FIG. 10.

Figure 10:
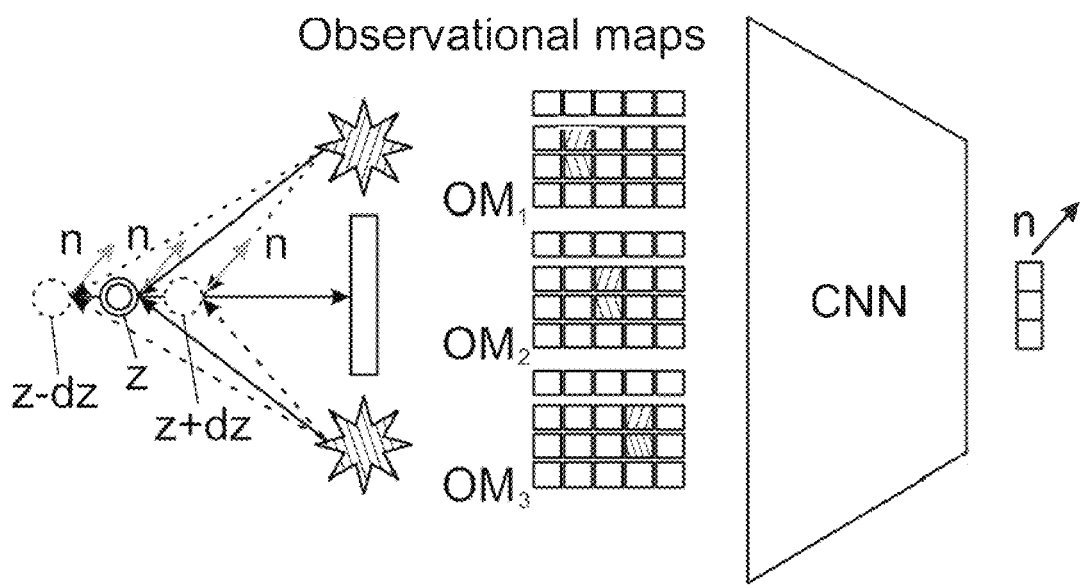
FIG. 10 is a schematic illustration of a process of perturbing ground truth estimate.
Figure 10:
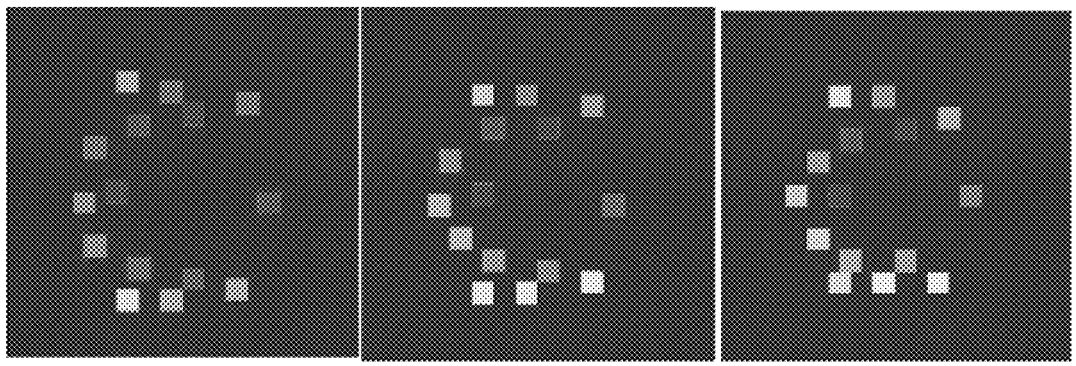

In Step S913, the near-field pixel values $i_m$ are divided by the augmented attenuation $\alpha_{aug}$ to obtain the augmented BRDF samples $j_m$, which are subsequently arranged on an observation map. The augmented BRDF samples differ slightly from the BRDF sample values obtained in Step S905 of this process, because of the applied augmentations in Steps S905, S907, S909 and S911. Training the network using the augmented BRDF will make the network gain robustness to these augmentations. An example of the augmented BRDF samples organised in observation maps, as a function of dz, are shown in FIG. 10. It can be seen that the position of the samples on the observation maps are also perturbed as the position of the samples also depends on z.

In Step S915, the viewing vector components $\hat{V}_x$ and $\hat{V}_y$ are also incorporated into the observation map by augmenting with two additional channels. $\hat{V}_x$ and $\hat{V}_y$ are added in order to reconstruct all points in the camera frustrum.

Figure 12:
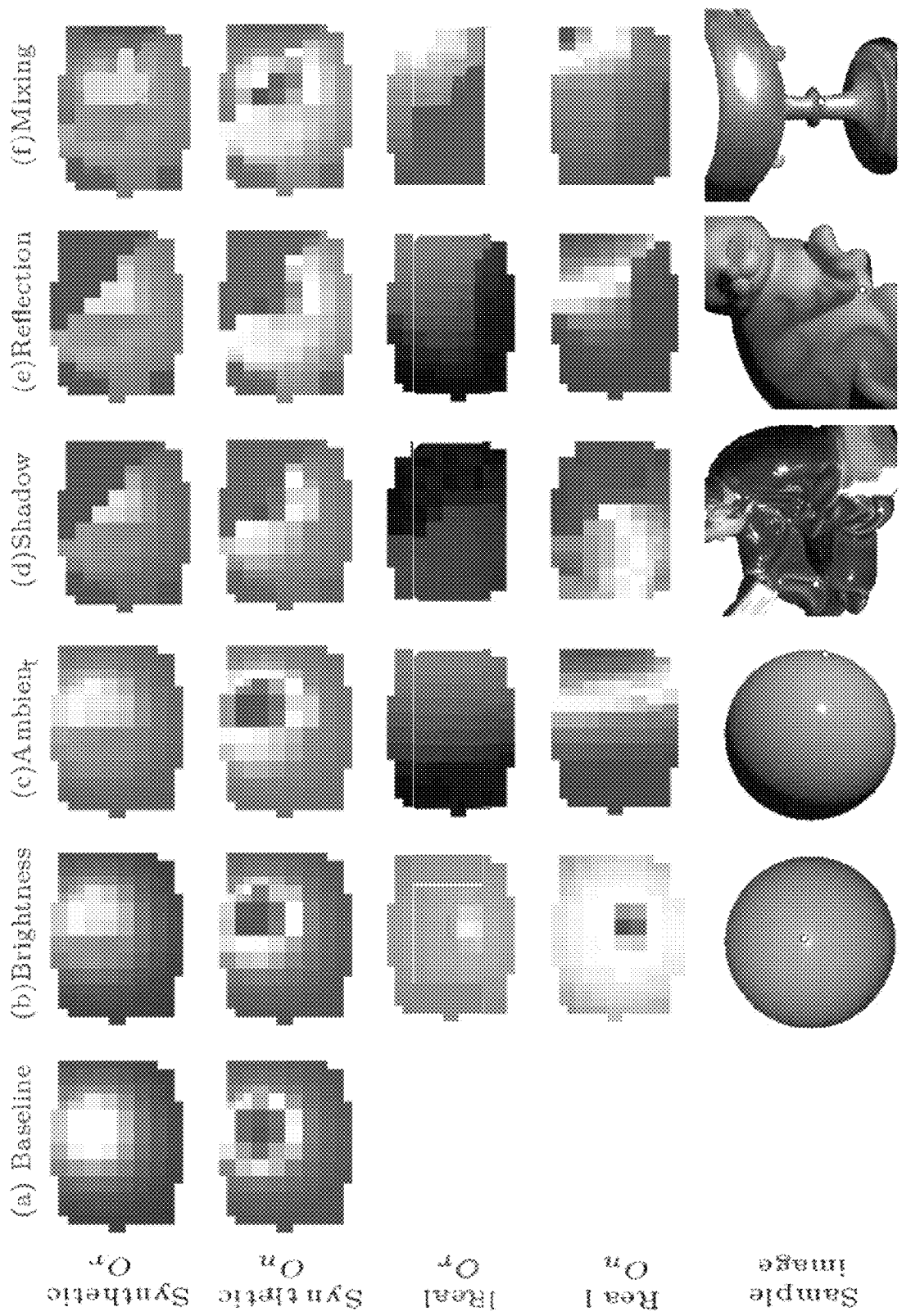
FIG. 12 is an illustration of the observation map augmentation process.

Finally, in Step S917, the observation maps are provided to the network which is trained to regress normals, by following the process explained in relation to FIG. 12. In practice, Step S917 is concurrent to the Steps S901 to S915, as new data is generated and provided to the network, while the network is being trained with the previously provided training data.

Figure 11:
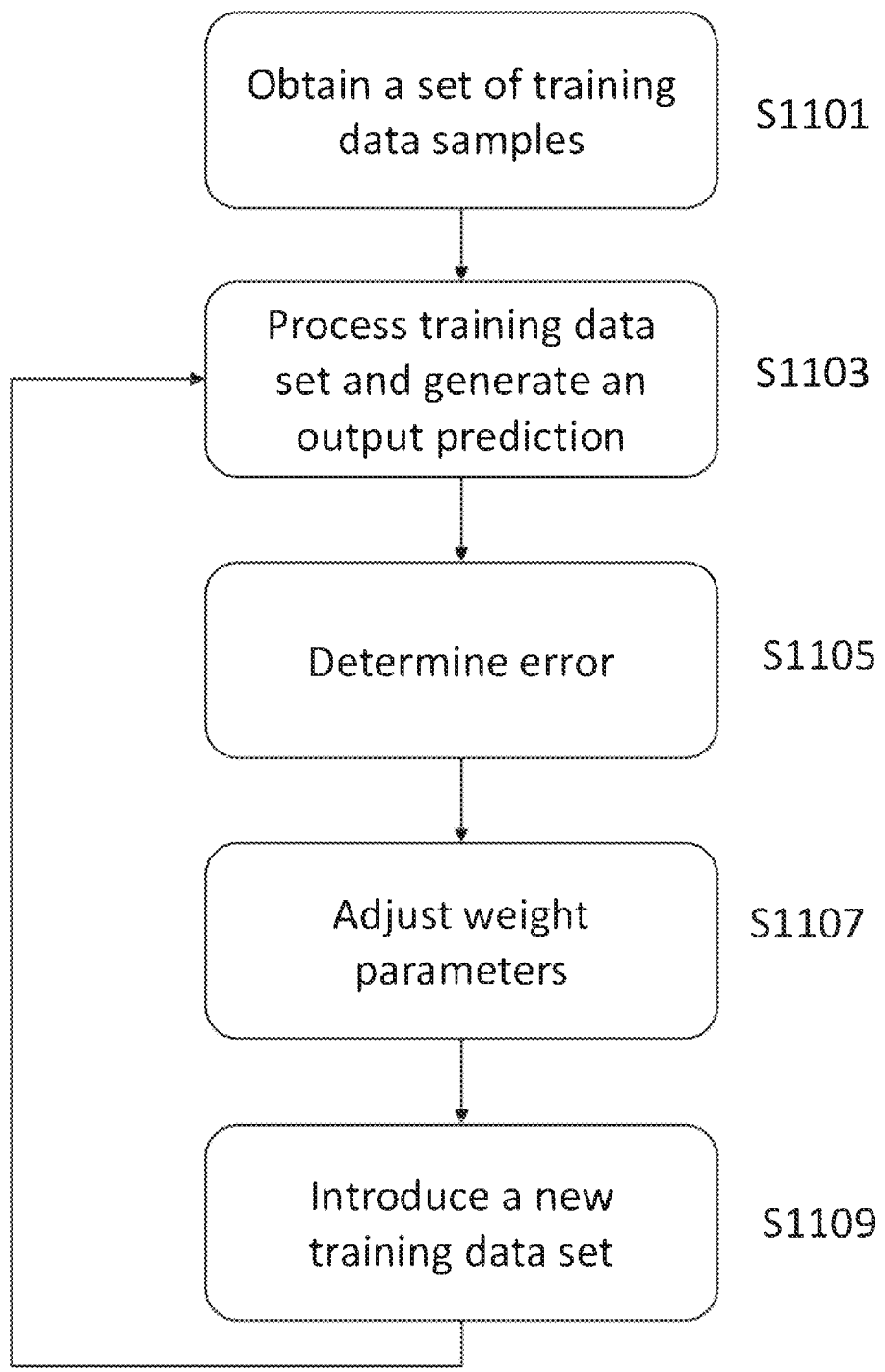
FIG. 11 is a flow-chart of an example process for training a neural network.

FIG. 11 illustrates a flowchart of an example process for training a neural network for regressing normals from photometric stereo images of a near-field object. The neural network can be trained by processing many samples of training data and, for every sample, adjusting the weight of each parameter in accordance with the error between the output generated by the neural network and a target output specified in the training sample. Once trained, the neural network can be deployed in a system, for example the neural network system of FIG. 1. The training procedure can be carried out by one or more computers.

In Step S1101, the training system obtains a set of training data. Each data set comprises a training observation map and a target output—Normal. The training target output of the training data sets represents the desired output which should be generated by the neural network. The target output is compared with the actual output of the neural network and the weighting parameters are adjusted so that the error between the target output and the generated output is reduced. In Step S1103, the neural network processes the input observation map using the current values of the internal parameters and generates and output prediction of the normal N.

In Step S1105, the predicted output of the neural network is compared with the target output and the error in the prediction is estimated. Consecutively, in Step S1107, the weight of each internal parameter is adjusted so that the error between the predicted output and the target output is reduced to minimum.

In Step S1109, the network is provided with a different set of training data and the training returns to step S603 in order to repeat the training procedure and adjust the internal parameters of the neural network so that a smaller error in the predicted output and the target output is achieved.

As mentioned above in relation to Step S905 and S909, the synthetically rendered observation maps are augmented to include real world imperfections as well as global illumination effect. Using global augmentation strategy for the training of the proposed network renders the proposed process applicable to real world data, despite training the network using pure synthetic observations maps of BRDF reflectances (the output of the pixel-wise renderer). The imperfections include global illumination effect due to interaction of the incoming/reflected light with other parts of the surface. In addition local effects are also considered.

An augmentation protocol is used to match the pixel-wise renderer data to real data. It is assumed that the BRDF samples j are a real number, where j∈[0, 1] with 0 being completely black and 1 being the saturated level (completely white). A uniform real distribution in the interval [a, b] is denoted as $U_R(a, b)$, a uniform integer one in the interval [k, l] is denoted as $U_{\mathbb{Z}}(k, l)$, and a normal distribution with mean μ and standard deviation σ are denoted as N(μ, σ).

75% of the training data is rendered using a random material from the Disney BRDF dataset. All 9 parameters (excluding anisotropy) namely metallic, subsurface, specular, roughness, specularTint, sheen, sheenTint, clearcoat and clearcoatGloss are sampled uniformly and independently.

25% of the training data are rendered using the following material augmentation strategy: a material $m \sim U_{\mathbb{Z}}(1,100)$ is selected at random from the MERL data set. Subsequently, $w \sim U_R(0, 1)$ is sampled at random. Finally, the material's BRDF $B_m$ is mixed with a Lambertian component N·L to get the overall reflectance of $$j=\emptyset\rho(wB_m(N,L)+(1-w)N\cdot L) \quad (10)$$

where Ø is the light source brightness and ρ is the pixels albedo.

Cast shadows are the result of a part of the surface blocking the light for a number of light sources, essentially turning the reflectance to zero for a region of the map. This can be indicated using a binary variable s∈{0,1}, which is 0 in the case of a shadow, and 1 when a shadow is not present. This is similar to blacking out a random region of the map. However, other augmentations are still applied in the shaded region resulting in non-zero values at these pixels.

Cast shadows are a highly structured phenomenon with high correlation between nearby light sources. Therefore, they are modelled as spheres placed on the upper hemisphere of the unit circle which is the domain of the light directions. In addition, for dataset, consisting of continues objects, if a shadow occurs in one direction, it will likely occur in all other directions with the same azimuth and more oblique elevation angles. Light directions close to the north pole ([0, 0, 1]) cannot be blocked by shadows as this equals the viewing direction to that surface point. Hence, the shading spheres are placed only on the equator of the unit sphere ([cos(θ), sin(θ), 0]). More specifically, the hyperparameters used are the following: the shadow augmentation is applied to 75% of the maps, containing $U_{\mathbb{Z}}(0, 0.1)$ shadows. The radius of the shading spheres is set to a truncated Gaussian with parameters N(30°, 15°).

Surface discontinuity. It is commonly assumed that each pixel corresponds to the reflection of a single surface point with a specific normal, i.e. differential approaches assuming $C^2$ continues surface. However, in practice, pixels have a finite size and thus it is likely that they are the superposition of the reflectance of multiple surface points with potentially different surface normals. This effect is mostly relevant at surface discontinuity points, i.e. occlusion boundaries and sharp edges (Lipschitz continuity). As the reflectance is a non-linear function of the surface normal, this mixing effect needs to be accounted as well. This is implemented by sampling multiple (t∈{1, 2, 3}) normals $N_k$ per pixel and then average out the respective intensity $b(N_k)$.

A considerable amount of light arriving at the surface point may be due to indirect illuminations, and following two cases are considered:

Ambient light. Real images contain some amount of ambient light, mostly due to light dispersing into the atmosphere and reflecting on other objects in the environment. Even if the photometric stereo images are captured in a dark room with no reflective objects, this effect still persists even though it is be very small, approximately 0.1% of the maximum intensity. Ambient light is modelled with an additive offset.

There is a similarity between the ambient light and self-reflections, thus from practical perspective, the two effects can be jointly addressed with two self-reflection constants ($r_H$, $r_L$). Both self-reflection and ambient light follow a very similar formulation with the most important difference being that self-reflection is not applied in light sources blocked by a cast shadow.

Specifically, self-reflections occur in specular object as the result of light using parts of the surface as auxiliary light sources. As hundreds of surface points could contribute into this effect, it is hard to be modelled. Therefore, self-reflections is modelled employing a first order approximation by adding a constant to the light source brightness in all regions with no cast shadows. Cast shadows are likely partially blocking self-reflections. Thus, self-reflections are modelled with two constants, one in the cast shadow regions, termed $r_L$, and constant $r_H$, for the rest of the map.

In addition, this additive constant is made proportional to N·V in order to avoid diminishing the signal to noise ration in oblique normals. These indirect illuminations effects are proportional to the light source brightness Ø. Thus, the self-reflection r is calculated as $$r=\emptyset N\cdot VU_R(0,0.1) \quad (11)$$

and is applied to 50% of the training data. The respective ambient light formula is $$a=\emptyset N\cdot VU_R(0,0.01) \quad (12)$$

and is applied to all training data.

Mixing. Pixels have a finite size and thus it is likely that they are the superposition of the reflectance of multiple surface points with potentially different surface normals. This effect is mostly relevant at surface discontinuity points, i.e. occlusion boundaries ($C_0$ discontinuity) and sharp edges ($C_1$ discontinuity). As the reflectance is a non-linear function of the surface normal, this mixing effect needs to be accounted as well.

For this effect, 15% of the training data is a weighted combination of the rendering of 2 or 3 'subpixels'. The mixing step is performed at the end of the rendering process before adding noise, as noise is a property of the camera applied to the total incoming light. For example, assuming that the reflection contribution of subpixel normals $N_1$ and $N_2$ are $i_1$ and $i_2$ respectively and that the mixing weights are $w_1$ and $w_2$ with $w_1+w_2=1$. Then, the total reflection used for creating the overall map is simply $i=i_1 w_1 + i_2 w_2$ and the overall normal (used for training the network) is $$N = \frac{w_1 N_1 + w_2 N_2}{\|w_1 N_1 + w_2 N_2\|} \quad (13)$$

Different mixed subpixels have different shadows and reflection distributions, which are completely independently sampled. In contrast, the material parameters and albedo are kept the same.

Light source brightness. As discussed above, the different light sources have varied brightness which the observations map parameterisation takes into account during the normalisation procedure. However, then real image pixels are saturated, the linear response of the camera sensor is broken. As the As the brightness is also channel dependent, this results into specular highlights not being completely white in the brightness compensated images, thus the need to be augmented for. The practical implementation involves sampling a brightness value Ø, multiplying the reflectances with the brightness value, applying the rest of the augmentation and then apply discretisation and saturation Light source brightness is sampled uniformly and independently inside the range found in the Diligent real dataset, and hence $b \sim U_R$ (0.28, 3.2).

The rendered reflectance value is discretised to a 16-bit integer representation mimicking real cameras. The discretisation and saturation function will be referred to with the symbol D.

Noise. Various types of noise are always present in real images, and specifically four types of noise are considered, namely: additive and multiplicative $N(1, 10^{-3})$, uniform $U_R(-10^{-4}, 10^{-4})$ and Gaussian noise $N(0, 10^{-4})$. It has empirically observed that there was a high level of correlation of noise with image brightness, therefore the most important component was established to be the multiplicative noise components, referred to as the additive noise component $n_A$ and the multiplicative noise component $n_M$. Thus the uniform multiplicative noise was set to 5%, $U_R(0.95, 1.05)$.

All of the above augmentation effects are combined with the base reflectance b, the overall augmented pixel value $j_m$ (for light source m) is calculated as $$j_m = D\left( \frac{1}{t} \sum_{k=1}^{t} (w^k (\emptyset_m * b_m^k + r_H^k - r_L^k) s_m^k + r_L^k) n_{M,m}^k + n_{A,m}^k \right) \quad (14)$$

Where k is indicating the different components that are averaged for the discontinuity compensation.

All of the augmentations used are summarised in Table 1 below:

TABLE 1

| Augmentation | Probability | Magnitude |
| --- | --- | --- |
| Materials | 0.25 | N/A |
| Light Brightness | 1 | $U_R$ (0.28, 3.2) |
| Shadow | 0.75 | $U_I$ (1, 10), $N$ (30°, 15°) |
| Self Reflection | 0.5 | $U_R$ (0, 0.1) |
| Ambient | 1 | $U_R$ (0, 0.1) |
| Mixing | 0.15 | $U_I$ (2, 3) |
| Noise Multiplicative | 1 | $U_R$ (0.95, 1.05) $N$ (1, $10^{-3}$) |
| Noise Additive | 1 | $U_R$ ($-10^{-4}$, $10^{-4}$) + $N$ (0, $10^{-4}$) |
| Quantisation | 1 | 16 bits |

FIG. 12 shows the observation map augmentation process that allows compensating synthetically rendered observation maps for imperfections associated with observation maps, generated from real data. The Figure shows RAW RBG maps (Component $O_r$) and normalised grey observation maps (component $O_n$) for both synthetic and real observation maps. In FIG. 12, (a) is the baseline map before any augmentations are applied. (b) shows the change when variable light sources brightness are considered (different pixels saturate at different levels and so the normalisation with the brightness distorts the specular highlights.) (c) shows the addition of ambient light that acts as an additive offset everywhere. (d) shows how cast shadows block all light except ambient light in regions of the map. (e) shows that self-reflections further increases the brightness in non-shadow regions. In the real data, it can be noticed by the fact that the mostly grey cat contains read pixels at the reflection point. (f) shows points at the sharp edge of the cup exhibiting discontinuity (which looks like the mixing of two different maps).

The synthetic observation maps are rendered with Diligent light so that they are comparable to the real observation maps, and random lights during train time has been used.

The performance of the process described above was evaluated using various experimental setups and CNN training procedures as well as various datasets were used for the evaluation.

For the evaluation of the proposed method, two synthetic and one real dataset are used. The real dataset is the Diligent dataset [B. Shi, Z. Wu, Z. Mo, D. Duan, S. K. Yeung, P. Tan: "A benchmark dataset and evaluation for non-lambertian and uncalibrated photometric stereo". In: CVPR. (2016)] consisting of 10 objects of varied materials and geometry. For each object, 96 images (612×512 pixels) are provided along with ground truth light source directions, brightness and normal maps. The 'Bear' object was removed because the first 20 images are corrupted.

Figure 13:
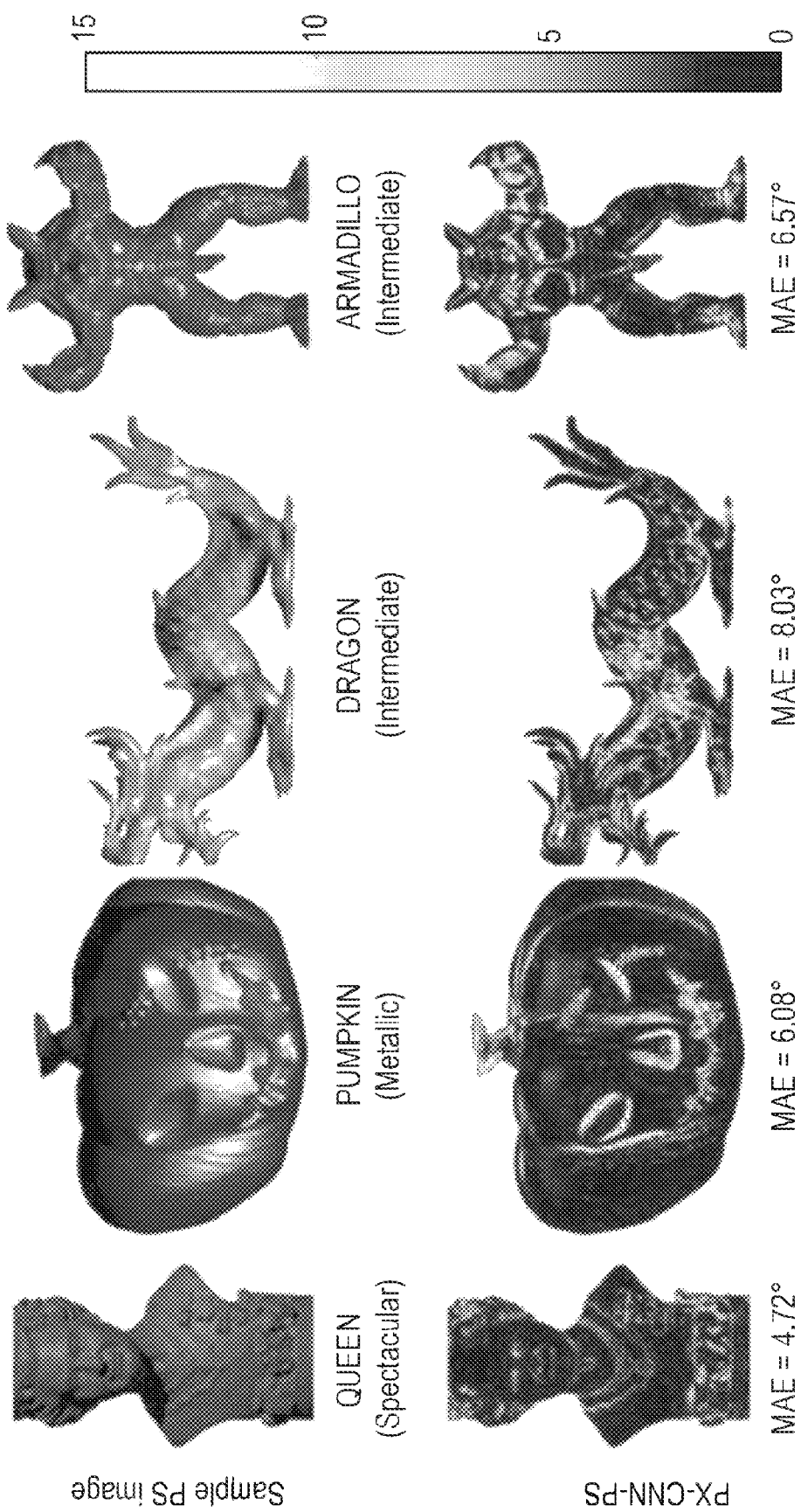
FIG. 13 is a test data from a synthetic test database and obtained results.

Additionally, a synthetic dataset of four objects was generated, the objects being QUEEN, PUMPKIN, ARMADILLO, and DRAGON, FIG. 13. These objects are non-convex and were rendered with rendering engine Blender (16 bit 512×512 pixel images) including realistic global illumination effects using the 96 light sources from DiLiGenT dataset. The four synthetically generated objects are single material/albedo objects. The QUEEN is purely specular, the PUMPKIN is purely metallic, and the ARMADILLO and the DRAGON are intermediate materials.

The ability of the network to learn materials is evaluated on a synthetic dataset using the MERL materials [W. Matusik, H. Pfister, M. Brand, L. McMillan: "data-driven reflectance model. ACM Transactions on Graphics (2003)]. For all 100 materials, 96 pixel-wise spheres are rendered using the DiLiGenT lights.

The experiments were performed using the proposed above network architecture called PX-NET which has been trained using the above-described rendering and augmentation procedure.

The network was implemented in Keras of Tensorflow 2.0, the rendering engine was implemented in Python and C++ with the only external dependence being opencv for basic vector algebra and input/output. The network was trained using the mean square error loss function on the normalised normals using the default setting of the Adam optimiser.

The training batch size was set at 2400 with 5000 batches per epoch (12 million maps). It was trained for 65 epochs which have taken around one day on a NVIDIA GeForce RTX 2080Ti (i.e. a little over 20 minutes per epoch). The train light distribution was set to 50-1000 random lights. The exact number of the augmentations are described in Table X above.

The evaluation metric for all the experiments is the mean angular error (MAE) between the predicted normals and the ground truth normals, measured in degrees. Normal error maps showing normal error (in degrees) per pixel offer a quantitative evaluation of the method.

For isotropic materials, a rotation of the observation map corresponds to an equivalent rotation of the surface normal around the z-axis. This can be exploited in order to perform a test time augmentation, by rotating the maps and thus obtain multiple normal predictions per pixel which can subsequently be averaged out to get a more accurate estimate. This is strategy is called Rotation pseudo-invariance, and up to 10 rotations, termed K=10 are used. If this test time augmentation is not used, the single network evaluation is termed K=1.

The first experiment aimed at evaluating the effect of the different augmentations and demonstrating how the network trained with per-pixel rendered data can even outperform the network trained with globally rendered train data. For that reason network PX-CNN-PS is proposed. PX-CNN-PS has the same architecture as CNN-PS.

The CNN-PS architecture comprises an initial convolutional layer, two dense block, comprising a plurality of layers, separated by a 'transition' processing stage and output processing stage is provided after the second dense block. Each dense blocks consist of a first group of layers and a second group of layers. The first group of layers comprises a ReLU activation layer, followed by a convolutional layer, comprising 16 filters with dimensions of 3×3, and a dropout layer, with a drop out coefficient of 0.2. The first group of layers is followed by a first concatenation layer, where the output of the initial convolutional layer is concatenated with the output of the first group of layers and the result is provided to the second group of layers. The second group of layers comprises a ReLU activation layer, followed by a convolutional layer, comprising 16 filter with dimensions of 3×3, and a dropout layer, with dropout coefficient of 0.2. A second concatenation layer is then provided to concatenate the output of the initial convolutional layer, the output of the first group of layers and the output of the second group of layers. The output of the concatenation layer is provided as input to the 'transition' processing stage. The 'transition' processing stage is used to change the feature map size from w×w, in the first dense layer to $$\left(\frac{w}{2} \times \frac{w}{2}\right),$$

In me second dense layer. The 'transition' processing stage comprises a ReLU activation layer, followed by a convolutional layer, comprising 48 convolutional filters with dimensions (1×1), a group-out layer, with drop out coefficient of 0.2, and an average pooling layer. The output of the 'transition' processing stage is provided as input to the second dense block, which comprises the same architecture as the first dense layer, with the only difference being that the feature maps now comprises dimensions of $$\left(\frac{w}{2} \times \frac{w}{2}\right).$$

The first concatenation layer of the second dense block concatenates the outputs of the 'transition' processing stage and the first group of layer of the second dense block. The second concatenation layer concatenates the outputs of the 'transition' processing stage, the output of the first group of layers in the second dense block, and the output of the second group of layers in the second dense block. Lastly, the output of the second dense layer, i.e. the output of the second concatenation layer of the second dense block, is provided to the output processing stage, which comprises a convolutional layer, comprising 80 convolutional filters with dimensions of (1×1), flattening layer which converts the output volume of the convolutional layer into an element vector, which is then processes by two fully connected layers with 128 and 3 filters respectively, and a normalization layer, which convert the feature to an unit vector. CNN-PS is trained with a mean squared loss between predicted and ground truth surface normal, and the loss function is minimised using Adam solver. The PX-CNN-PS network is trained with per-pixel rendered data, and the effect of the incrementally applying the series of augmentations is observed. In this experiment were used only materials sampled from the Disney BRDF.

Figure 14:
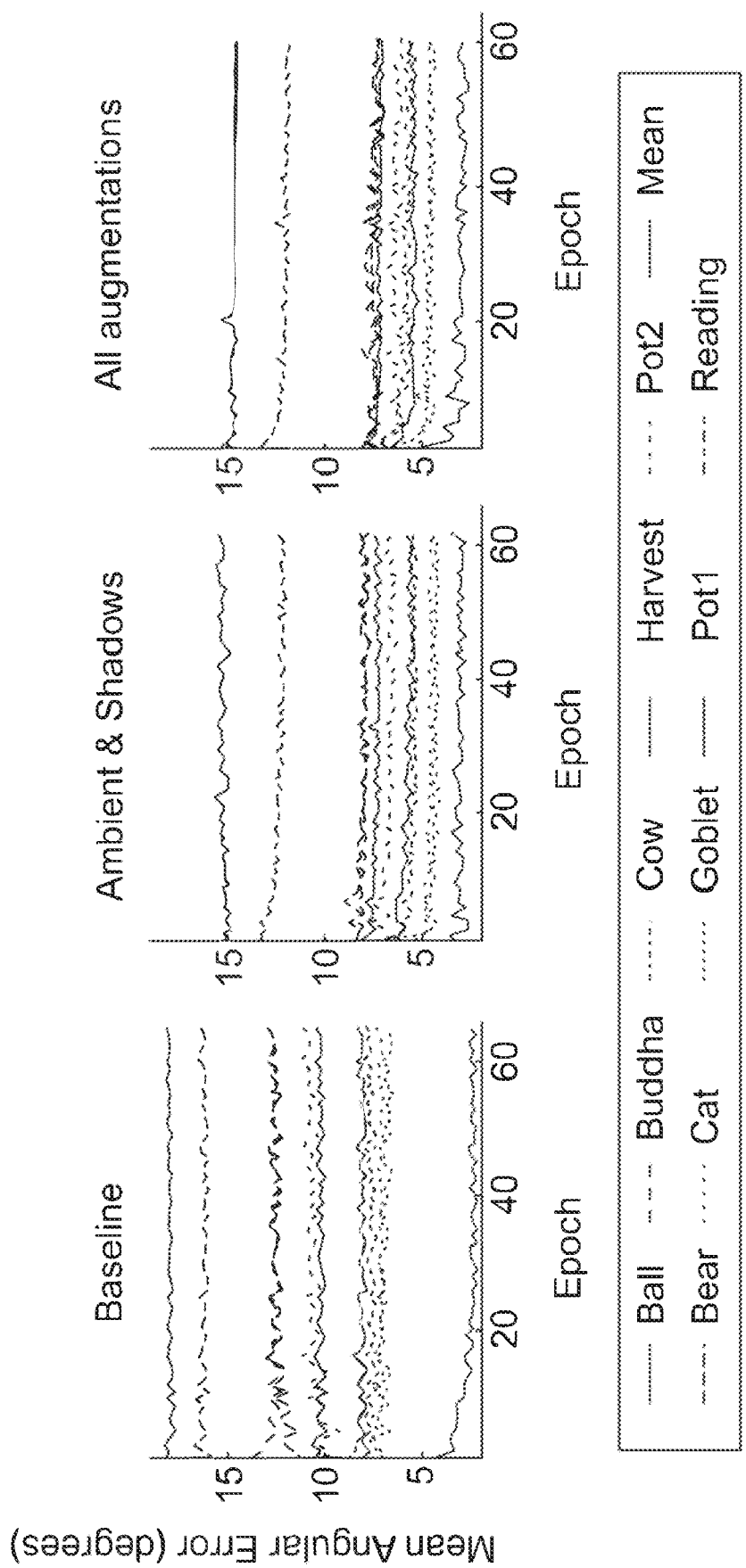
FIG. 14 is MAE evolution (during training) curves.
Figure 15:
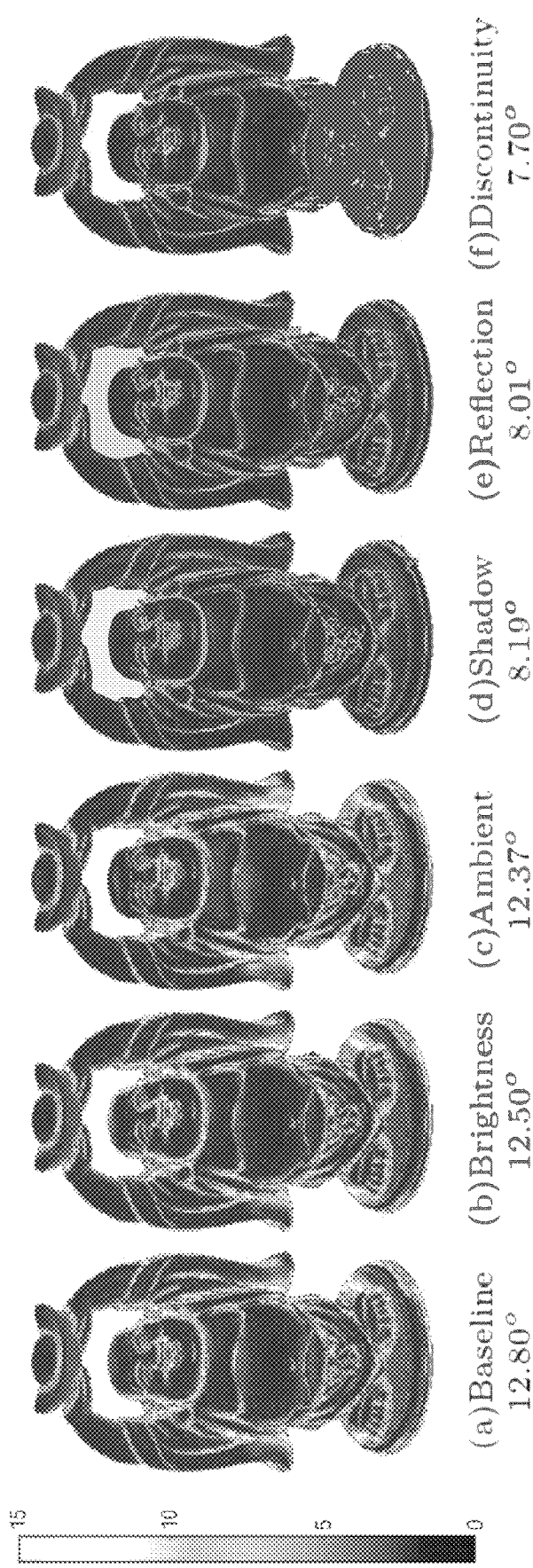
FIG. 15 is a demonstration of the effect of incremental augmentations on a 'Buddha' object.
Figure 16:
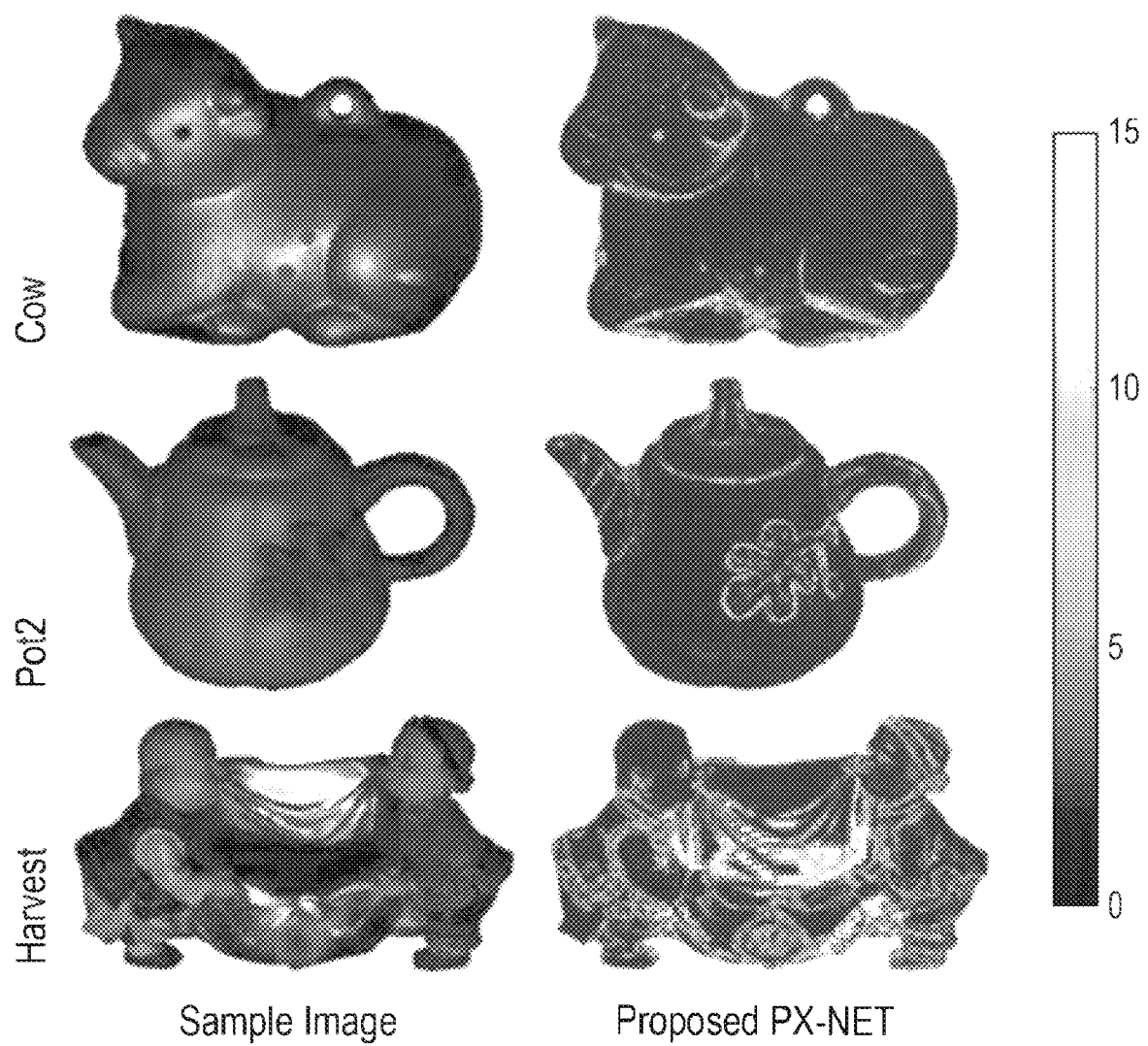
FIG. 16 is representation of sample error maps of three objects.

The evaluation was performed on the real DiLiGent dataset. The results can are shown in FIGS. 14 and 15 and in Table 2 below. FIG. 14 shows the MAE evolution curves during training, illustrating the performance of the networks trained with successive augmentations. The accuracy is measured in MAE on the real DiLiGenT objects. The Figure shows: (1) the baseline with no augmentations; (2) ambient and global shadows only; and (3) all augmentations. It is observed that successive augmentations improve performance by sifting downwards the error curves with only notable exception being the Ball as it suffers the least from the global illumination effects.

FIG. 15 shows the effect of incremental augmentations in the performance of PX-CNN-PS on the 'Buddha' object of the real DiLiGenT dataset. (a) shows the result with the baseline network, and for the rest of the augmentations, most of the improvements are at: (b) specular highlights middle of pot, (c) top of head, (d) in most concave regions, (e) middle of head, (f) sleeves.

Table 2 demonstrates the effect of incremental augmentations in the performance of PX-CNN-PS on the real data of DiLiGent. The performance is almost monotonic for all objects, with the only exception being the 'Ball', which is perfectly smooth (no discontinuities) and has no shadows so these augmentations decrease the performance of these objects.

TABLE 2

| Augmentation | Ball | Bear | Buddha | Cat | Cow | Goblet | Harvest | Pot1 | Pot2 | Reading | Mean |
|---|---|---|---|---|---|---|---|---|---|---|---|
| Baseline | 2.38 | 6.82 | 12.8 | 7.28 | 7.92 | 12.9 | 18.09 | 8.31 | 11.09 | 16.31 | 10.39 |
| +Brightness | 2.79 | 7.09 | 12.5 | 7.02 | 8 | 12.85 | 18.03 | 7.72 | 10.71 | 16.29 | 10.3 |
| +Ambient | 3.14 | 0.51 | 12.37 | 7.23 | 7.4 | 11.43 | 17.25 | 8.16 | 9.31 | 16.14 | 9.89 |
| +Shadow | 3.76 | 4.64 | 8.19 | 4.93 | 5.69 | 8.08 | 15.6 | 5.99 | 6.82 | 12.53 | 7.64 |
| +Reflection | 2.64 | 4.54 | 8.01 | 18.1 | 5.87 | 8.32 | 15.08 | 5,88 | 7.5 | 12.5 | 7.51 |
| +Discontinuity | 3.13 | 4.8 | 7.7 | 4.76 | 5.82 | 7.49 | 14.68 | 5.62 | 6.25 | 12.08 | 7.23 |

It is observed that the application of augmentations monotonically improved performance on most objects and the average error across the whole dataset.

Figure 22:
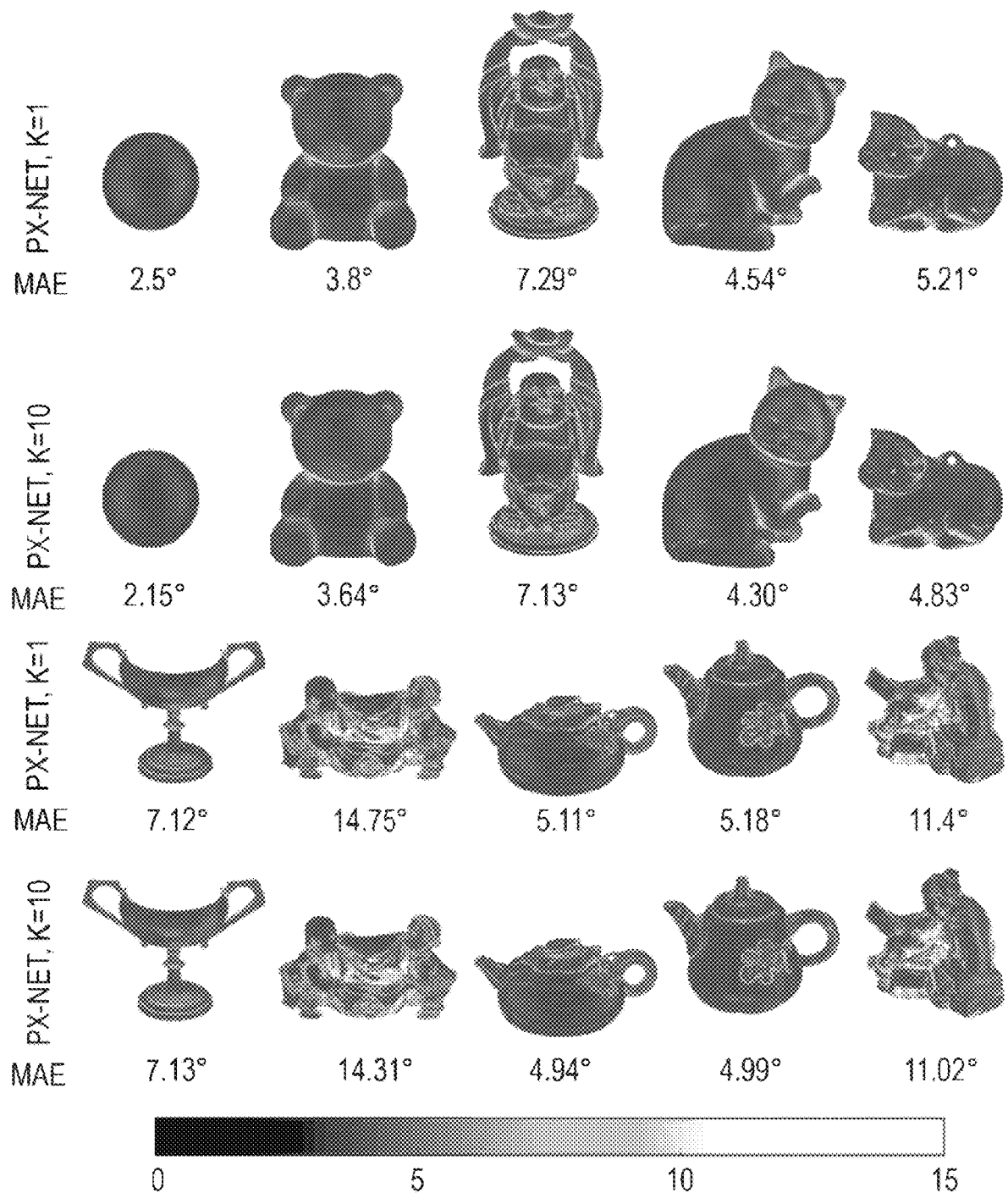
FIG. 22 is a visual comparison of result on the DiLiGenT dataset.
Figure 23:
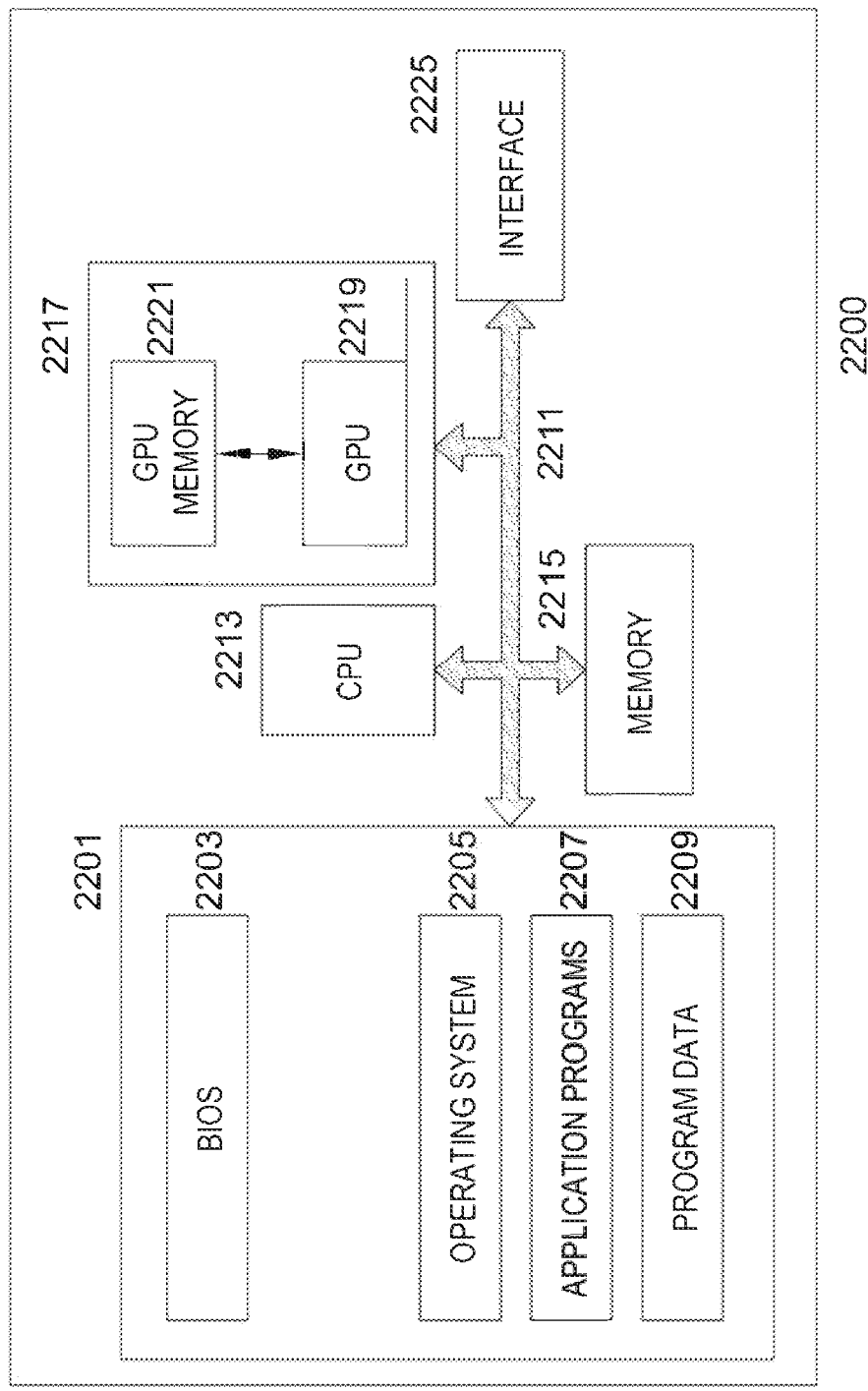
FIG. 23 is a schematic of a system in accordance with an embodiment.

Table 3, shows a quantitative comparison of the proposed method (both the simplified PX-CNN-PS and full PX-NET) on the DiLiGenT real benchmark. Results are also presented for K=10, FIG. 22.

TABLE 2

| Augmentation | Ball | Bear | Buddha | Cat | Cow | Goblet | Harvest | Pot1 | Pot2 | Reading | AVG |
|---|---|---|---|---|---|---|---|---|---|---|---|
| PX-CNN-PS, K = 1 | 3.13 | 4.8 | 7.7 | 4.76 | 5.82 | 7.49 | 14.68 | 5.62 | 6.25 | 12.08 | 7.23 |
| PX-CNN-PS, K = 10 | 2.52 | 4.06 | 7.63 | 4.4 | 5.86 | 7.8 | 14.49 | 5.2 | 6.43 | 11.76 | 7.01 |
| PX-NET, K = 1 | 2.50 | 3.80 | 7.29 | 4.54 | 5.21 | 7.12 | 14.75 | 5.11 | 5.18 | 11.40 | 6.69 |
| PX-NET, K = 10 | 2.15 | 3.64 | 7.13 | 4.30 | 4.83 | 7.13 | 14.31 | 4.94 | 4.99 | 11.02 | 6.45 |

In Table 3 are also presented the results for both PX-CNN-PS and PX-NET after applying the test time rotation pseudo-invariance augmentation, denoted by (K=10). These results can be attributed to the ability of the network to deal with real world materials with complex reflectance as well as simultaneously being very robust to global illumination effects due to the employed augmentation strategy.

Figure 17:
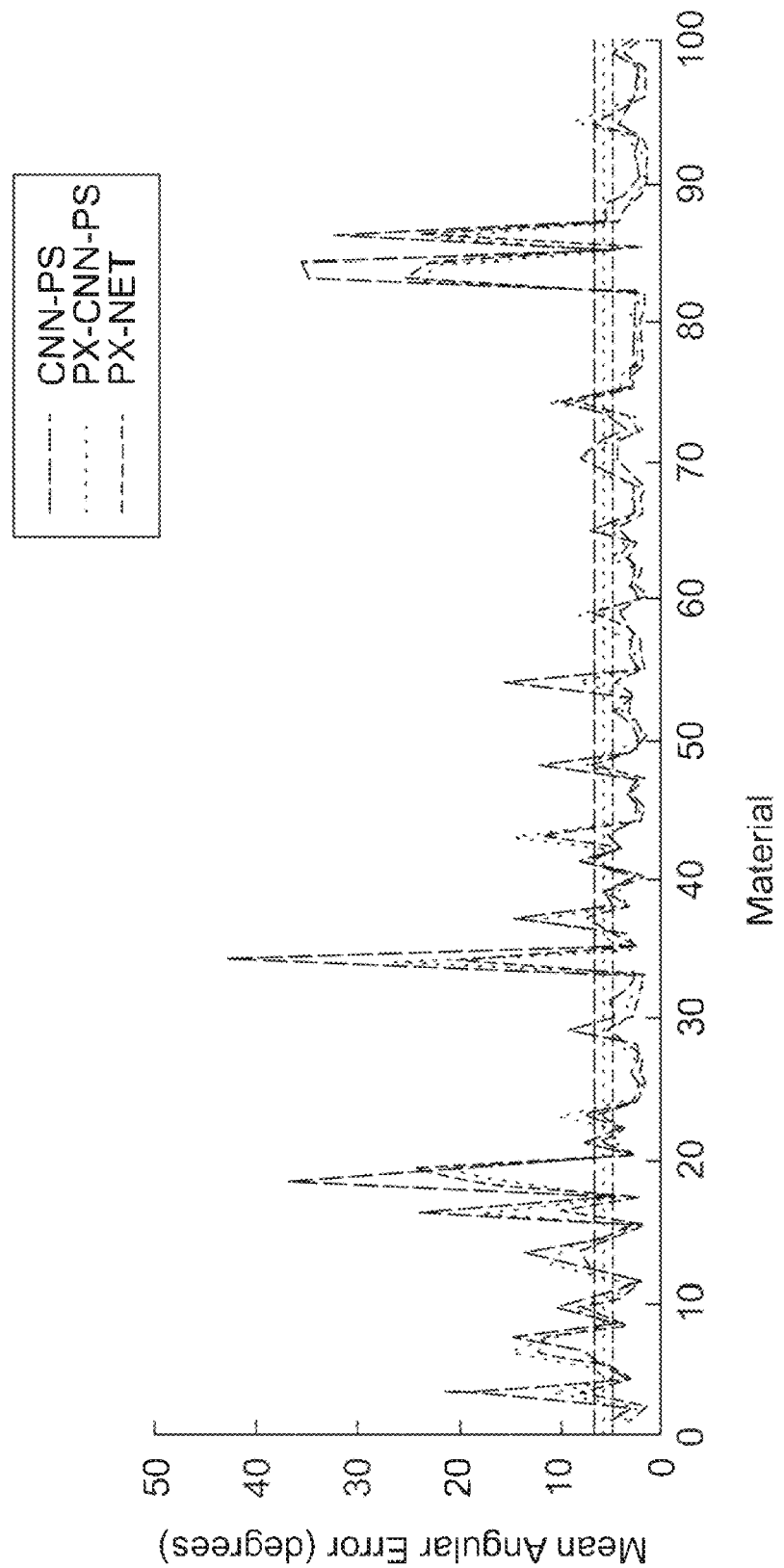
FIG. 17 is a graphical comparison of networks performance.

In addition, three sample error maps are presented in FIG. 17 (for the K=1 network evaluation). The Figure shows that the proposed PX-NET performs well in the convex region due to using more broad set of materials at train time. This is evident on the COW, which is coated with metallic paint. The Pot2 error map demonstrates the strength of the proposed discontinuity augmentation on the leaf boundary. The Harvest error map shows that PX-NET performance in some concave regions (bellow left head).

The above results are also confirmed on the synthetic, globally rendered objects, presented in FIG. 13, which presents the results obtained with the proposed PX-CNN-PS. PX-CNN-PS achieves on average MAE 7.90°.

The performance of the currently proposed network, compared both of the proposed networks (PX-CNN-PS and PX-NET) with CNN-PS on the synthetic images rendered with MERL materials, FIG. 17. This experiment demonstrates that the proposed networks can deal with various real world reflectance. The results, shown in the Figure are for a single prediction (K=1) with corresponding mean errors 6.7 (CNN-PS), 5.8 (PX-CNN-PS), 4.8 (PX-NET) also shown as horizontal lines. PX-CNN-PS outperformed CNN-PS (6.7° vs. 5.8° MAE), which is attributed to the fact that the whole set of parameters of Disney was sampled, instead of a limited subset.

In another experiment, the proposed method was evaluated using real data captured with a custom made photometric stereo imaging apparatus.

Figure 18:
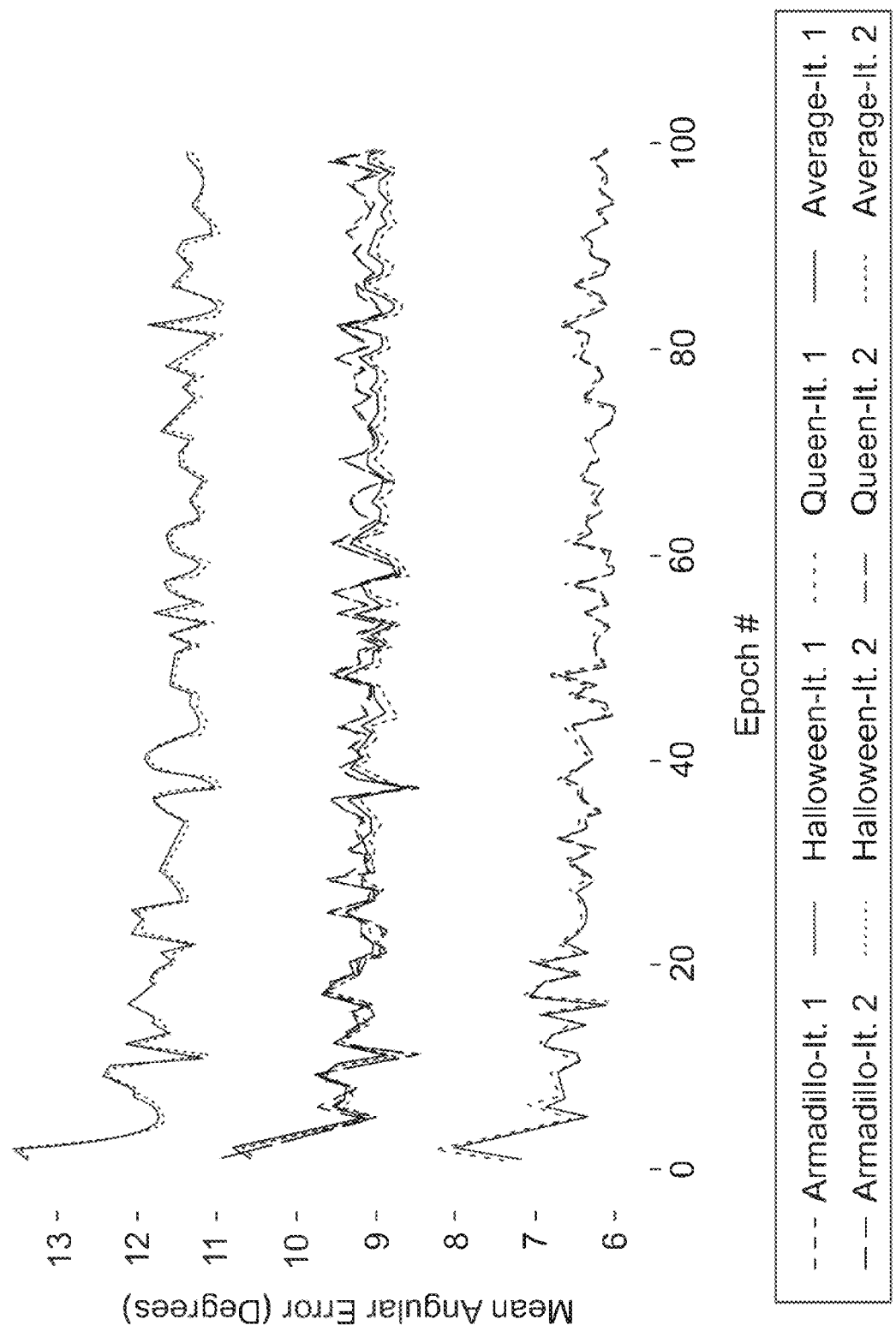
FIG. 18 is a graph showing the MAE evolution in predicting normals at first and third iteration.

The apparatus capturing photometric stereo images consisted of a printed circuit board with 15 white LEDs rigidly attached to a camera FLEA3 3.2 Megapixels with a 8 mm lens. The LEDs are evenly spaced around the camera at a maximum distance of 6.5 cm and are placed in a co-planar fashion with the image plane. The PX-NET network was implemented in Keras of Tensorflow 2.0. The training batch size was set at 1600 with 10000 batches per epoch (16 million maps). The network was trained for 100 epochs on 3× NVIDIA GeForce 1080 (a little over 15 minutes per epoch, and around a day for all epochs) and using mean squared error loss function on the normalised normals the Adam optimiser with basic LR $10^{-3}$ and LR decay of 0.1% per epoch after epoch 10. The model test performance evolution over time (epochs) is shown in FIG. 18. The reconstruction computation time was a few minutes with the bottleneck being the python implementation of the numerical integration.

Figure 19:
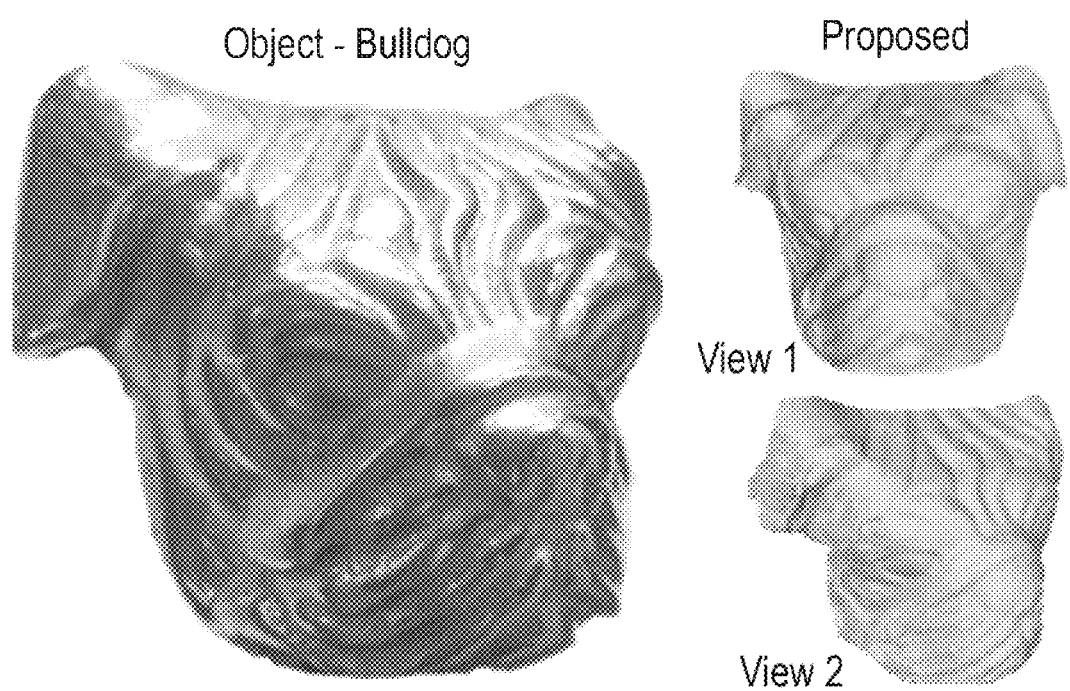
FIG. 19 is a representation of real metallic-silver Bulldog statue.
Figure 20:
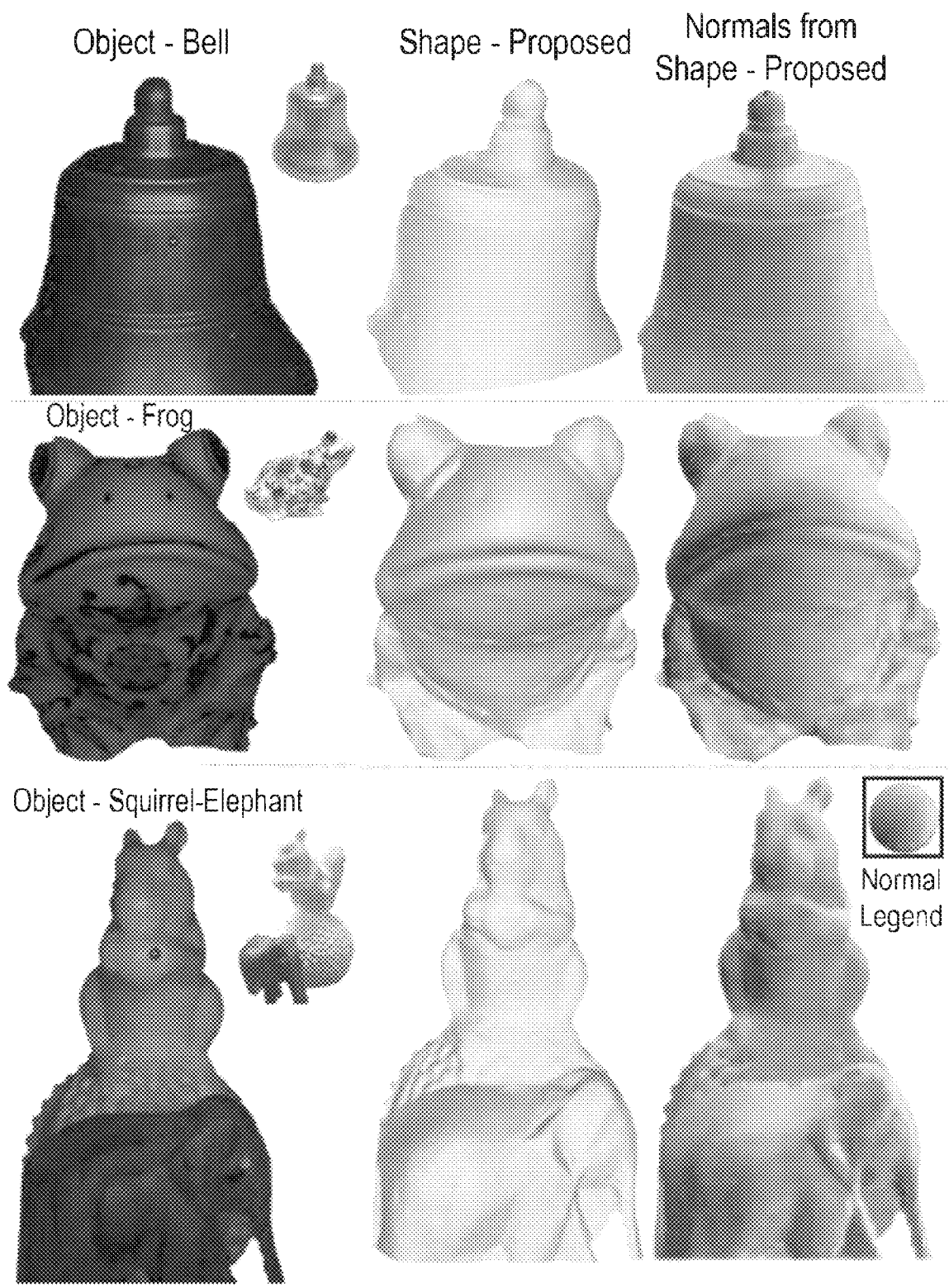
FIG. 20 is a representation of real objects metallic-gold Bell, a porcelain Frog, and a multi-object scene.

Using this setup four image sequences were captured, namely a metallic-silver bulldog, shown in FIG. 19, a metallic-gold Bell, a porcelain Frog, as well as a multi-object scene featuring a shiny wooden elephant statue in front of a porcelain squirrel, shown in FIG. 20. The objects were placed around 15 centimetres away from the camera and the initial depth estimate was approximated using a ruler. As there was no ground truth available for these objects, the evaluation on this dataset was only quantitative. FIG. 20 shows that the reconstruction of the proposed method does not exhibit any visible deformation in specular highlights (middle of bell and elephant) or cast shadow regions (belly of frog and bottom of squirrel). These are the result of training the network with realistic BRDF samples (Disney and MERL) and the use of data augmentation strategy accounting for shadows and self-reflections.

Figure 21:
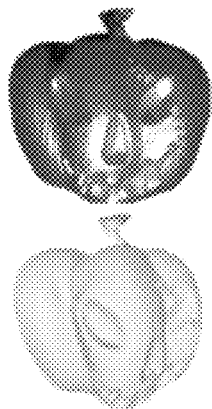
FIG. 21 is a visualisation of results of quantitative experiments.
Figure 21:
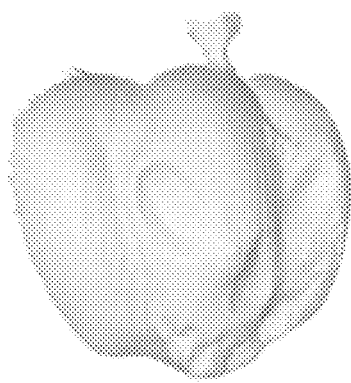
Figure 21:
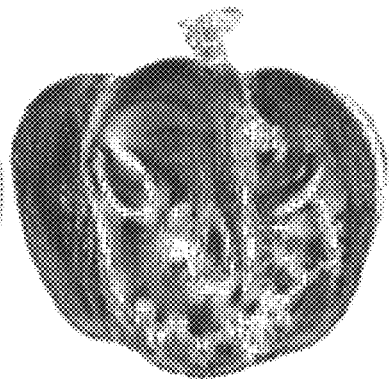
Figure 21:
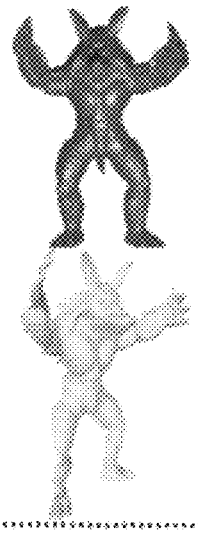
Figure 21:
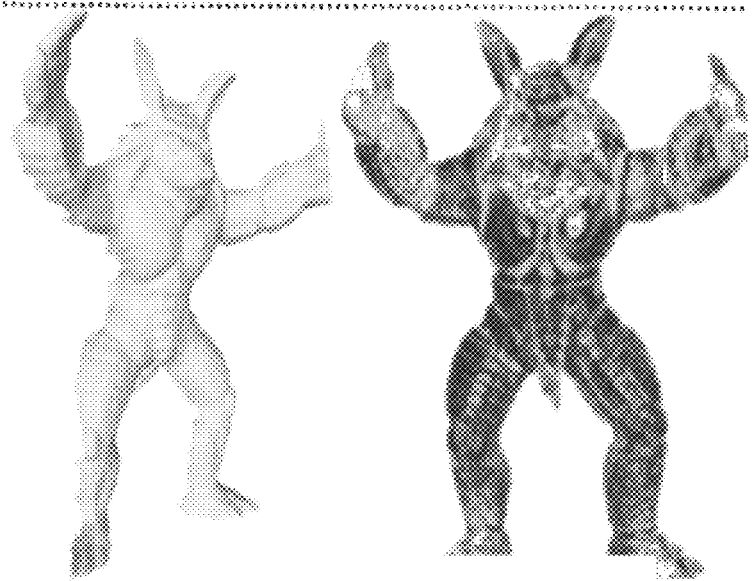
Figure 21:
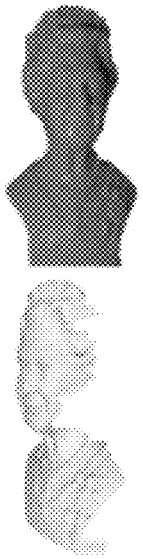
Figure 21:
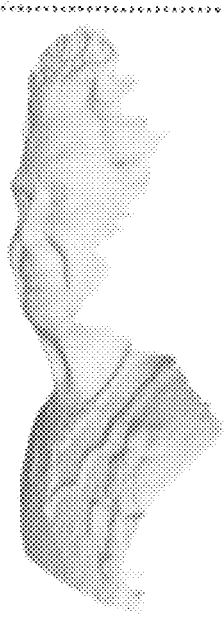
Figure 21:
Figure 21:
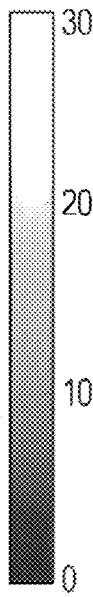

Quantitative experiments are also presented using a synthetic dataset rendered with Blender, setting the light source configuration to closely reflect the real capture setup proposed above. The Cycles render engine is used to generate realistic global illumination effects such as cast shadows and self-reflections. The assumed BRDF was the Disney one. Three objects are presented here namely QUEEN, which had a dielectric specular material, HALLOWEEN, which was purely metallic, and ARMADILLO, which had an intermediate material, FIG. 21. The Figure shows the ability of the proposed network to cope with various materials and achieve state-of-the-art performance.

As no realistic depth map is C2 continues, Ground truth (GT) normals are not compatible with the Ground truth (GT) depth. Integrating the GT normals and the re-calculating them with numerical differentiation introduced 4.62° MAE on average, Table 4. Table 4 shows full quantitative comparison on synthetic data reported MAE on the raw network predictions (NfCNN) and MAE after differentiation of the surface (NfS). Since the network is trained to compute normals, the first figure tends to be slightly lower.

TABLE 4

| Method | Armadillo | Halloween | Queen | AVG NormDepth | AVG |
| --- | --- | --- | --- | --- | --- |
| GT normals-NfS | 5.62 | 3.5 | 4.75 | 4.62 | 2.04 |
| Adapted-PX-Net-NfCNN | 13.11 | 18.66 | 7.42 | 13.06 | — |
| Adapted-PX-Net-NfS | 13.87 | 18.03 | 8.5 | 13.47 | 2.10 |
| Proposed-GT Depth-NfCNN | 9.03 | 11.33 | 6.31 | 8.89 | — |
| Proposed-Iteration 1-NfCNN | 9.05 | 11.47 | 6.58 | 9.03 | — |
| Proposed-Iteration 1-NfS | 10.82 | 11.8 | 8.16 | 10.26 | 2.65 |
| Proposed-Iteration 2-NfCNN | 9.04 | 11.38 | 6.39 | 8.94 | — |
| Proposed-Iteration 2-NfS | 10.81 | 11.7 | 8.02 | 10.18 | 2.63 |

FIG. 24 is a schematic of the hardware that can be used to implement methods in accordance with embodiments. It should be noted that this is just one example and other arrangements can be used.

The hardware comprises a computing section 2200. In this particular example, the components of this section will be described together. However, it will be appreciated they are not necessarily co-located.

Components of the computing system 2200 may include, but not limited to, a processing unit 2213 (such as central processing unit, CPU), a system memory 2201, a system bus 2211 that couples various system components including the system memory 2201 to the processing unit 2213. The system bus 2211 may be any of several types of bus structure including a memory bus or memory controller, a peripheral bus and a local bus using any of a variety of bus architecture etc. The computing section 2200 also includes external memory 2215 connected to the bus 2211.

The system memory 2201 includes computer storage media in the form of volatile/or non volatile memory such as read-only memory. A basic input output system (BIOS) 2203 containing the routines that help transfer information between the elements within the computer, such as during start-up is typically stored in system memory 2201. In addition, the system memory contains the operating system 2205, application programs 2207 and program data 2209 that are in use by the CPU 2213.

Also, interface 2225 is connected to the bus 2211. The interface may be a network interface for the computer system to receive information from further devices. The interface may also be a user interface that allows a user to respond to certain commands et cetera.

Graphics processing unit (GPU) 2219 is particularly well suited to the above described method due to the operation of this multiple parallel calls. Therefore, in an embodiment, the processing may be divided between CPU 2213 and GPU 2219.

The above described architecture also lends itself to mobile telephones using GPUs.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A computer vision method comprising:
   receiving a set of photometric stereo images of an object, the set of photometric stereo images comprising a plurality of images using illumination from different lighting directions using one or more light sources;
   using a trained neural network to generate a normal map of the object; and
   producing a three-dimensional (3D) reconstruction of the object from the normal map,
   wherein using the trained neural network comprises converting the set of photometric stereo images to an input form suitable for an input layer of the trained neural network,
   wherein the input form comprises, for each pixel, a representation of the different lighting directions and their corresponding intensities which have been obtained from the photometric stereo images to which a compensation has been applied, the compensation being determined from an estimate of a distance between a light source of the light sources and a point on the object to which the pixel corresponds, and
   wherein the input form comprises an observation map provided for each pixel, the observation map including channels which correspond to components of a viewing vector.

2. The computer vision method of claim 1, wherein, once the normal map is generated by the trained neural network, the 3D reconstruction of the object is obtained and the obtained 3D reconstruction of the object is then used to produce an updated input form and a further normal map is generated from the updated input form.

3. The computer vision method of claim 2, wherein generating the normal map is an iterative process where successive reconstructions of the object are used to produce updated input forms until convergence of the reconstruction of the object, the updated input forms including the updated input form.

4. The computer vision method of claim 3,
   wherein the input form comprises a plurality of observation maps, and
   wherein an observation map is provided for each pixel, the observation map comprising a projection of the lighting directions onto a 2D plane, the lighting directions for each pixel being derived from a compensated photometric stereo image of the photometric stereo images to which the compensation has been applied.

5. The computer vision method of claim 4, wherein the observation maps of the plurality of observation maps are updated by compensating the photometric stereo images using a latest reconstruction of the object.

6. The computer vision method of claim 5, wherein the photometric stereo images are compensated for real-world illumination effects, a compensation amount being derived from the latest reconstruction of the object.

7. The computer vision method of claim 6, wherein the compensation amount is based on 3D coordinates of a point on the latest reconstruction of the object.

8. The computer vision method of claim 6, wherein the compensation amount is provided by:

$$\alpha_m(X) = \phi_m \frac{(\hat{L}_m(X) \cdot \hat{S}_m)^{\mu_m}}{\|L_m(X)\|^2}$$

where $\alpha_m(X)$ is an attenuation factor, X is 3D surface point coordinates of a point, the point coordinates expressed as $X=[x, y, z]^T$, $\emptyset_m$ is intrinsic brightness of the light source m, $S_m$ is a principle direction of the light source, $\mu_m$ is an angular dissipation factor, and $\hat{L}_m(X)$ is a lighting direction, the lighting direction defined as $L_m(X)/\|L_m(X)\|$.

9. The computer vision method of claim 4, wherein the observation map for each pixel is a three-dimensional map comprising a plurality of channels, the channels corresponding to components of a viewing vector.

10. The computer vision method of claim 9, wherein at least one of the plurality of channels of the observation map comprises information from which the viewing vector for each pixel can be derived.

11. The computer vision method of claim 9, wherein the plurality of channels of the observation maps comprise at least one of viewing vector components $\hat{V}_x$ or $\hat{V}_y$.

12. A non-transitory carrier medium carrying computer readable instructions adapted to cause a computer to perform the method of claim 1.

13. A computer implemented method of training a model, wherein the model comprises:
- a conversion stage to convert a set of photometric stereo images to an input form suitable for an input of the model, the input form comprising, for each pixel, a representation of different lighting directions and their corresponding intensities which have been obtained from the photometric stereo images to which a compensation has been applied, the compensation being determined from an estimate of a distance between a light source and a point on an object to which the pixel corresponds;
- a first processing stage to process the input form with a neural network processing stage to produce a normal map of the object; and
- a second processing stage to process the normal map of the object to produce an output three dimensional (3D) reconstruction of the object, wherein the set of photometric stereo images comprises a plurality of images using illumination from different directions using one or more light sources, wherein the method comprises:
- providing training data, the training data comprising the set of photometric stereo images of the object and 3D reconstruction of the object; and
- training the model using the photometric stereo images as the input and comparing an output of the trained model with the 3D reconstruction, and wherein the input form comprises an observation map provided for each pixel, the observation map including channels which correspond to components of a viewing vector.

14. The computer implemented method of claim 13, wherein the input form comprises a plurality of observation maps, and wherein an observation map is provided for each pixel, the observation map comprising a projection of the lighting directions onto a 2D plane, the lighting directions for each pixel being derived from a compensated photometric stereo image of the photometric stereo images to which the compensation has been applied.

15. The computer implemented method of claim 14, wherein the observation maps are obtained from the photometric stereo images to which the compensation has been applied, the compensation being determined from a distance between a light source of the light sources and a point on the object to which the pixel corresponds.

16. The computer implemented method of claim 15, wherein the photometric stereo images are provided by:

$$j_m = D\left(\frac{1}{t}\sum_{k=1}^{t}(w^k(\emptyset_m * b_m^k + r_H^k - r_L^k)s_m^k + r_L^k)n_{M,m}^k + n_{A,m}^k\right)$$

where $j_m$ is a pixel value for light source m, D is a discretisation and saturation function, w is a weight value, $\emptyset_m$ is the intrinsic light source brightness, b is base reflectance, $r_H$ and $r_L$ are self-reflection constants, s is cast shadow binary variable, $n_A$ is additive noise, and $n_M$ is multiplicative noise, k is indicative of discontinuity compensation components, t is a sampling multiple.

17. The computer implemented method of claim 14, wherein the plurality of observation maps include real world illumination effects.

18. The computer implemented method of claim 14, wherein the plurality of observation maps include at least one of cast shadows, self-reflections; surface discontinuity; ambient light; light source brightness and noise.

19. The computer-implemented method of claim 14, wherein the observation maps are provided for each pixel based on an augmented ground truth three-dimensional coordinate of a point of the object to which the pixel corresponds.

20. A system comprising:
an interface; and
a processor, wherein
the interface has an image input and configured to receive a set of photometric stereo images of an object, the set of photometric stereo images comprising a plurality of images using illumination from different directions using one or more light sources,
the processor is configured to:
- convert the set of photometric stereo images to an input form suitable for an input of a model, said input form comprising, for each pixel, a representation of the different lighting directions and their corresponding intensities which have been obtained from the photometric stereo images to which a compensation has been applied, the compensation being determined from an estimate of a distance between a light source of the light sources and a point on the object to which the pixel corresponds;
- process the input form with a neural network processing stage to produce a normal map of the object; and
- process the normal map of the object to produce an output three dimensional (3D) reconstruction of the object, and the input form comprises an observation map provided for each pixel, the observation map including channels which correspond to components of a viewing vector.

21. A computer vision method comprising:
receiving a set of photometric stereo images of an object, the set of photometric stereo images comprising a plurality of images using illumination from different lighting directions using one or more light sources;
using a trained neural network to generate a normal map of the object; and
producing a three-dimensional (3D) reconstruction of the object from the normal map, wherein using the trained neural network comprises converting the set of photometric stereo images to an input form suitable for an input layer of the trained neural network, wherein the input form comprises, for each pixel, a representation of the different lighting directions and their corresponding intensities which have been obtained from the photometric stereo images to which a compensation has been applied, the compensation being determined from an estimate of a distance between a light source of the light sources and a point on the object to which the pixel corresponds, wherein, once the normal map is generated by the trained neural network, the 3D reconstruction of the object is obtained and the obtained 3D reconstruction of the object is then used to produce an updated input form and a further normal map is generated from the updated input form, wherein generating the normal map is an iterative process where successive reconstructions of the object are used to produce updated input forms until convergence of the reconstruction of the object, the updated input forms including the updated input form, wherein the input form comprises a plurality of observation maps, wherein an observation map is provided for each pixel, the observation map comprising a projection of the lighting directions onto a 2D plane, the lighting directions for each pixel being derived from a compensated photometric stereo image of the photometric stereo images to which the compensation has been applied, and wherein the observation maps of the plurality of observation maps are updated by compensating the photometric stereo images using a latest reconstruction of the object.

22. The computer vision method of claim 21, wherein the photometric stereo images are compensated for real-world illumination effects, a compensation amount being derived from the latest reconstruction of the object.

23. The computer vision method of claim 22, wherein the compensation amount is based on 3D coordinates of a point on the latest reconstruction of the object.

24. The computer vision method of claim 22, wherein the compensation amount is provided by:

$$\alpha_m(X) = \emptyset_m \frac{(\hat{L}_m(X) \cdot \hat{S}_m)^{\mu_m}}{\|L_m(X)\|^2}$$

where $\alpha_m(X)$ is an attenuation factor, X is 3D surface point coordinates of a point, the point coordinates expressed as X=[x, y, z]T, $\emptyset_m$ is intrinsic brightness of the light source m, $S_m$ is a principle direction of the light source, $\mu_m$ is an angular dissipation factor, and $\hat{L}_m(X)$ is a lighting direction, the lighting direction defined as $L_m(X)/\|L_m(X)\|$.

25. A computer vision method comprising:
receiving a set of photometric stereo images of an object, the set of photometric stereo images comprising a plurality of images using illumination from different lighting directions using one or more light sources;
using a trained neural network to generate a normal map of the object; and
producing a three-dimensional (3D) reconstruction of the object from the normal map, wherein using the trained neural network comprises converting the set of photometric stereo images to an input form suitable for an input layer of the trained neural network, wherein the input form comprises, for each pixel, a representation of the different lighting directions and their corresponding intensities which have been obtained from the photometric stereo images to which a compensation has been applied, the compensation being determined from an estimate of a distance between a light source of the light sources and a point on the object to which the pixel corresponds, wherein, once the normal map is generated by the trained neural network, the 3D reconstruction of the object is obtained and the obtained 3D reconstruction of the object is then used to produce an updated input form and a further normal map is generated from the updated input form, wherein generating the normal map is an iterative process where successive reconstructions of the object are used to produce updated input forms until convergence of the reconstruction of the object, the updated input forms including the updated input form, wherein the input form comprises a plurality of observation maps, wherein an observation map is provided for each pixel, the observation map comprising a projection of the lighting directions onto a 2D plane, the lighting directions for each pixel being derived from a compensated photometric stereo image of the photometric stereo images to which the compensation has been applied, wherein the observation map for each pixel is a three-dimensional map comprising a plurality of channels, the channels corresponding to components of a viewing vector, and wherein at least one of the plurality of channels of the observation map comprises information from which the viewing vector for each pixel can be derived.

26. A computer vision method comprising:
receiving a set of photometric stereo images of an object, the set of photometric stereo images comprising a plurality of images using illumination from different lighting directions using one or more light sources;
using a trained neural network to generate a normal map of the object; and
producing a three-dimensional (3D) reconstruction of the object from the normal map, wherein using the trained neural network comprises converting the set of photometric stereo images to an input form suitable for an input layer of the trained neural network, wherein the input form comprises, for each pixel, a representation of the different lighting directions and their corresponding intensities which have been obtained from the photometric stereo images to which a compensation has been applied, the compensation being determined from an estimate of a distance between a light source of the light sources and a point on the object to which the pixel corresponds, wherein, once the normal map is generated by the trained neural network, the 3D reconstruction of the object is obtained and the obtained 3D reconstruction of the object is then used to produce an updated input form and a further normal map is generated from the updated input form, wherein generating the normal map is an iterative process where successive reconstructions of the object are used to produce updated input forms until convergence of the reconstruction of the object, the updated input forms including the updated input form,
wherein the input form comprises a plurality of observation maps,
wherein an observation map is provided for each pixel, the observation map comprising a projection of the lighting directions onto a 2D plane, the lighting directions for each pixel being derived from a compensated photometric stereo image of the photometric stereo images to which the compensation has been applied,
wherein the observation map for each pixel is a three-dimensional map comprising a plurality of channels, the channels corresponding to components of a viewing vector, and
wherein the plurality of channels of the observation maps comprise at least one of viewing vector components $\hat{V}_x$, or $\hat{V}_y$.

27. A computer implemented method of training a model, wherein the model comprises:
 a conversion stage to convert a set of photometric stereo images to an input form suitable for an input of the model, the input form comprising, for each pixel, a representation of different lighting directions and their corresponding intensities which have been obtained from the photometric stereo images to which a compensation has been applied, the compensation being determined from an estimate of a distance between a light source and a point on an object to which the pixel corresponds;
 a first processing stage to process the input form with a neural network processing stage to produce a normal map of the object; and
 a second processing stage to process the normal map of the object to produce an output a three dimensional (3D) reconstruction of the object,
wherein the set of photometric stereo images comprises a plurality of images using illumination from different directions using one or more light sources,
wherein the method comprises:
 providing training data, the training data comprising the set of photometric stereo images of the object and 3D reconstruction of the object; and
 training the model using the photometric stereo images as the input and comparing an output of the trained model with the 3D reconstruction,
wherein the input form comprises a plurality of observation maps,
wherein an observation map is provided for each pixel, the observation map comprising a projection of the lighting directions onto a 2D plane, the lighting directions for each pixel being derived from a compensated photometric stereo image of the photometric stereo images to which the compensation has been applied,
wherein the observation maps are obtained from the photometric stereo images to which the compensation has been applied, the compensation being determined from a distance between a light source of the light sources and a point on the object to which the pixel corresponds,
wherein the photometric stereo images are provided by:

$$j_m = D\left(\frac{1}{t}\sum_{k=1}^{t}(w^k(\emptyset_m * b_m^k + r_H^k - r_L^k)s_m^k + r_L^k)n_{M,m}^k + n_{A,m}^k\right)$$

where $j_m$ is a pixel value for light source m, D is a discretisation and saturation function, w is a weight value, $\emptyset_m$ is the intrinsic light source brightness, b is base reflectance, $r_H$ and $r_L$, are self-reflection constants, s is cast shadow binary variable, $n_A$ is additive noise, and $n_M$ is multiplicative noise, k is indicative of discontinuity compensation components, t is a sampling multiple.

* * * * *